United States Patent
Shrivastava et al.

(10) Patent No.: US 11,416,351 B2
(45) Date of Patent: Aug. 16, 2022

(54) SYSTEM AND METHOD FOR EFFICIENT REPLICATION

(71) Applicant: Nutanix, Inc., San Jose, CA (US)

(72) Inventors: Brajesh Kumar Shrivastava, Bengaluru (IN); Abhishek Gupta, Bengaluru (IN); Pranab Patnaik, Cary, NC (US); Kai Tan, Cary, NC (US)

(73) Assignee: Nutanix, Inc., San Jose, CA (US)

( * ) Notice: Subject to any disclaimer, the term of this patent is extended or adjusted under 35 U.S.C. 154(b) by 101 days.

(21) Appl. No.: 17/135,166

(22) Filed: Dec. 28, 2020

(65) Prior Publication Data

US 2022/0027241 A1     Jan. 27, 2022

Related U.S. Application Data

(60) Provisional application No. 63/054,734, filed on Jul. 21, 2020.

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1451* (2013.01); *G06F 2009/4557* (2013.01); *G06F 2201/84* (2013.01)

(58) Field of Classification Search
CPC ............. G06F 11/1469; G06F 9/45558; G06F 11/1451; G06F 2009/4557; G06F 2201/84; G06F 2009/45562
See application file for complete search history.

(56) References Cited

U.S. PATENT DOCUMENTS

| | | |
|---|---|---|
| 7,996,636 B1 | 8/2011 | Prakash et al. |
| 8,549,518 B1 | 10/2013 | Aron et al. |
| 8,601,473 B1 | 12/2013 | Aron et al. |
| 8,805,786 B1 * | 8/2014 | Natanzon ............... G06F 16/10 707/639 |
| 8,850,130 B1 | 9/2014 | Aron et al. |
| 8,863,124 B1 | 10/2014 | Aron |

(Continued)

FOREIGN PATENT DOCUMENTS

WO    WO-2019/112955    6/2019

OTHER PUBLICATIONS

Cano, Ignacio et al. "Curator: Self-Managing Storage for Enterprise Clusters" 14th {USENIX} Symposium on Networked Systems Design and Implementation. NSDI 17. 2017. pp. 1-16 (Year: 2017).

(Continued)

*Primary Examiner* — Francisco A Grullon
(74) *Attorney, Agent, or Firm* — Foley & Lardner LLP

(57) ABSTRACT

A system and method determining a Chain Identification Number (CID) of a source snapshot to be replicated from a source site to a target site of a virtual computing system, determining a predetermined number of potential reference snapshots based on the CID of the source snapshot, computing a closeness value between the source snapshot and each of the potential reference snapshots, and creating a list of the potential reference snapshots based on the closeness value of each of the potential reference snapshots. One snapshot from the list is selected as a reference snapshot. The source snapshot is replicated to the target site based on the reference snapshot.

30 Claims, 12 Drawing Sheets

(56) References Cited

U.S. PATENT DOCUMENTS

| | | | |
|---|---|---|---|
| 9,009,106 | B1 | 4/2015 | Aron et al. |
| 9,069,708 | B2 | 6/2015 | Gill et al. |
| 9,311,014 | B2 | 4/2016 | Ezra et al. |
| 9,311,034 | B2 | 4/2016 | Sharpe et al. |
| 9,336,132 | B1 | 5/2016 | Aron et al. |
| 9,400,613 | B1* | 7/2016 | Chopra .............. G06F 11/1458 |
| 9,600,193 | B2 | 3/2017 | Ahrens et al. |
| 9,652,265 | B1 | 5/2017 | Narayanasamy et al. |
| 9,747,287 | B1 | 8/2017 | Bhardwaj et al. |
| 9,766,930 | B2 | 9/2017 | Tarasuk-Levin et al. |
| 9,767,106 | B1* | 9/2017 | Duggal ................... G06F 11/14 |
| 9,772,866 | B1 | 9/2017 | Aron et al. |
| 2020/0301784 | A1* | 9/2020 | Chen ..................... G06F 3/0604 |

OTHER PUBLICATIONS

Cano, Ignacio, et al. "Curator: Self-Managing Storage for Enterprise Clusters" (Mar. 27, 2017), from https://www.usenix.org/conference/nsdi17/.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

The Nutanix Bible; from https://nutanixbible.com/; accessed on Jun. 8, 2017.

The Nutanix Bible; from https://nutanixbible.com/; accessed on Jun. 9, 2016.

* cited by examiner

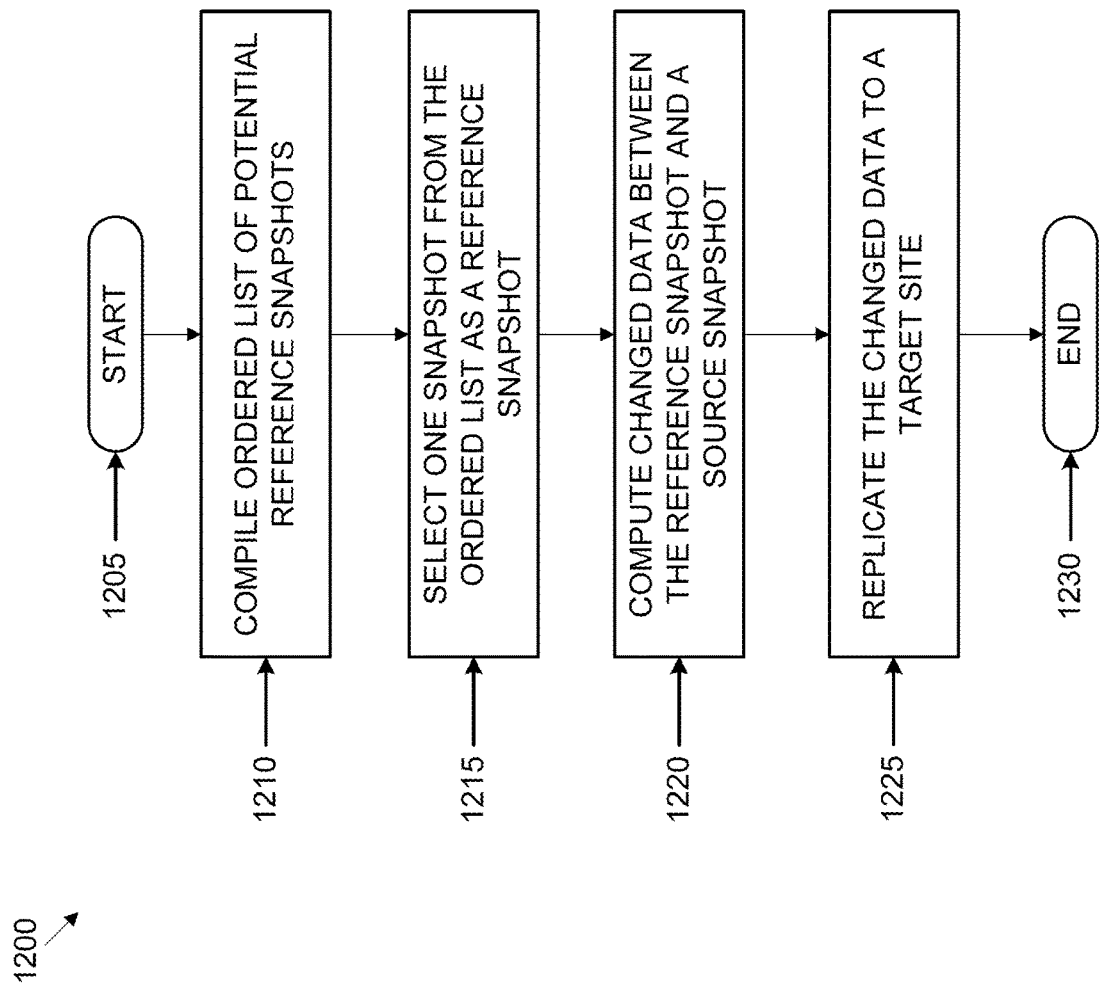

SYSTEM AND METHOD FOR EFFICIENT REPLICATION

CROSS-REFERENCE TO RELATED APPLICATIONS

This application is a non-provisional of U.S. Provisional Application No. 63/054,734, filed on Jul. 21, 2020, the entirety of which is incorporated by reference herein.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, present-day virtual computing systems have limitations due to their configuration and the way they operate.

SUMMARY

In accordance with some aspects of the present disclosure, a method is disclosed. The method includes determining, by a processor executing computer-readable instructions stored on a memory, a Chain Identification Number (CID) of a source snapshot to be replicated from a source site to a target site of a virtual computing system, determining, by the processor, a predetermined number of potential reference snapshots based on the CID of the source snapshot, computing, by the processor, a closeness value between the source snapshot and each of the potential reference snapshots, and creating, by the processor, a list of the potential reference snapshots based on the closeness value of each of the potential reference snapshots. One snapshot from the list is selected as a reference snapshot and the source snapshot is replicated to the target site based on the reference snapshot.

In accordance with some other aspects of the present disclosure, a system is disclosed. The system includes a processor that executes computer-readable instructions stored on a memory to determine a Chain Identification Number (CID) of a source snapshot to be replicated from a source site to a target site of a virtual computing system, determine a predetermined number of potential reference snapshots based on the CID of the source snapshot, compute a closeness value between the source snapshot and each of the potential reference snapshots, and create a list of the potential reference snapshots based on the closeness value of each of the potential reference snapshots. One snapshot from the list is selected as a reference snapshot and the source snapshot is replicated to the target site based on the reference snapshot.

In accordance with yet other aspects of the present disclosure, a non-transitory computer readable media having computer-executable instructions stored thereon is disclosed. The instructions when executed by a processor of a virtual computing system cause the processor to perform a process. The process includes determining a Chain Identification Number (CID) of a source snapshot to be replicated from a source site to a target site of a virtual computing system, determining a predetermined number of potential reference snapshots based on the CID of the source snapshot, computing a closeness value between the source snapshot and each of the potential reference snapshots, and creating a list of the potential reference snapshots based on the closeness value of each of the potential reference snapshots. One snapshot from the list is selected as a reference snapshot and the source snapshot is replicated to the target site based on the reference snapshot.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 12 is another example flowchart outlining operations for replicating data from the source site to the target site, in accordance with some embodiments of the present disclosure.

Figure 1:
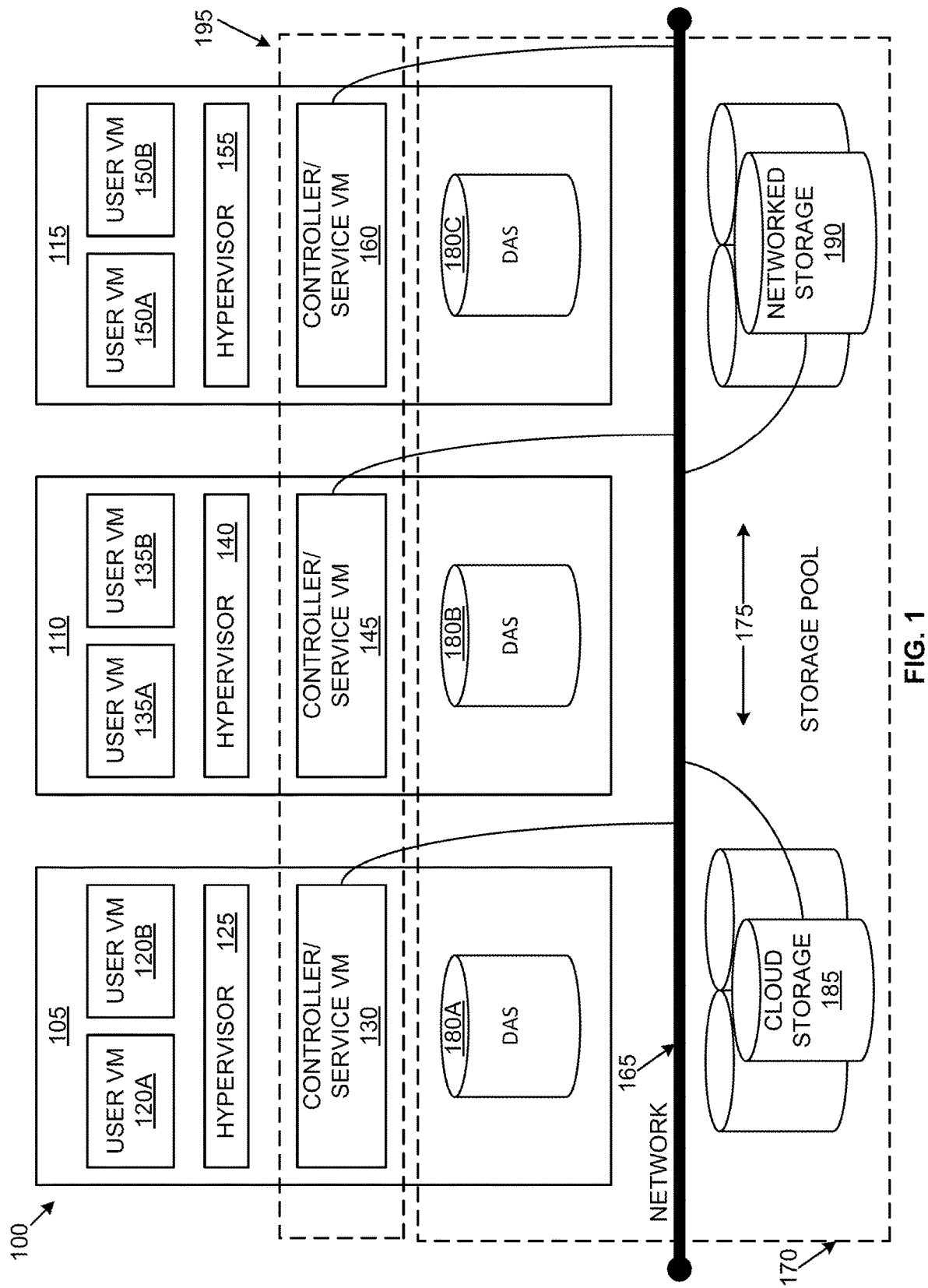
FIG. 1 is an example block diagram of a cluster of a virtualized environment, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a virtualized environment (e.g., a virtual computing system), and particularly a hyperconverged virtualized environment, having a plurality of clusters, with each of the plurality of clusters having a plurality of nodes. Each of the plurality of nodes includes one or more virtual machines and other entities managed by an instance of a monitor such as a hypervisor. "Entity" or "entities" of the virtualized environment may include, in addition to a virtual machine, a container, a software application, a volume group, or any other element or resource of the virtualized environment that is desired to be replicated/backed-up. These and other components may be part of a datacenter, which may be managed by a user (e.g., an administrator or other authorized personnel). A distributed storage system, for providing storage and back-up capabilities, may be associated with the virtualized environment. Virtualized environments may be configured to protect entities operating on a source site of the virtualized environment. The entities may be protected by creating back-ups of those entities and storing those back-ups at a target site. By creating the back-ups of the entities, a continuity of operation of the entities may be maintained in the aftermath of a disaster condition.

A disaster condition may include planned outages, performance related failures, component failures, power failures, natural calamities, or any other condition that hampers the normal operation of entities in the virtualized environment. Generally speaking, a disaster condition may be any condition that causes hardware failure, software failure, firmware failure, or any combination thereof that prevents the underlying entity from operating as intended. By creating a back-up of the entity, when a disaster condition strikes, a replicated copy of the entity may be accessed from the target site to continue operation until the entity is back up and running again on the source site.

To create a back-up of an entity, the configuration of that entity may need to be known. The "configuration" of an entity may include the set of resources that are assigned to that entity and that allow the entity to operate as intended. For example, configuration may include the allocated processing capacity (e.g., central processing unit(s) ("CPU")), memory, network interfaces, user interfaces, etc. These allocated resources of the entity may be catalogued within a configuration file that may be stored within the distributed storage system or within a configuration database associated with the virtualized environment. The configuration may also include storage disks (e.g., virtual disks or vdisks)/logical unit numbers ("LUNs") and the data associated with the storage disks/LUNs may be stored within a storage file. The storage file may also be stored within the distributed storage system. Thus, the configuration of an entity may be represented by the combination of the entity's configuration file(s) (or configuration database(s)) and storage file(s). The set of files of an entity may be associated with one or more vdisks and may be considered that entity's namespace.

The back-up of an entity may be created by capturing a snapshot of the entity (e.g., of the one or more vdisks associated with that entity). In a hyperconverged virtualized environment, a "snapshot" is a point in time image of the entity (e.g., of the one or more vdisks associated with that entity). Thus, the snapshot may include a complete encapsulation of the entity, including the configuration data of the entity, the user data, and any metadata associated with the entity—all of which may be reflected in the configuration file(s) and the storage file(s) of the virtual machine. In other words, a snapshot may be considered a read only copy at a point in time of the namespace of the entity. Any of a variety of snapshotting techniques may be used. For example, in some embodiments, copy-on-write, redirect-on-write, or other snapshotting methods may be used to capture snapshots. The captured snapshots may be stored on the source site and/or replicated to the target site. In addition to capturing snapshots, in some cases, clones of entities may be created. A cloned entity may be considered an operational copy of the entity (e.g., of the one or more vdisks associated with that entity) from which the clone is created. Upon completion of the cloning operation, the cloned entity may be considered a separate operational entity. A cloned entity may also be considered a new namespace. Thus, the vdisks associated with each entity may be snapshotted as well as cloned. In some embodiments, cloned entities may be created from one or more previously captured snapshots of the vdisks. Additional snapshots may be created from the cloned entities.

When snapshots and clones are replicated to the target site, a large amount of data needs to be transferred to the target site. One option is to transfer all the data associated with the snapshot/clone being replicated. This may require transfer of a large amount of data to the target site and storage of the transferred data at the target site. Such a transfer may also be time consuming (e.g., take longer) and is generally undesirable. Since each snapshot/clone may reflect an incremental change from another snapshot/clone, another option is to only transfer data that has changed relative to another snapshot or clone. The changed data between a first snapshot/clone and a second snapshot/clone is called "delta." Thus, in some embodiments, replication of one full snapshot/clone to the target site may be followed by several incremental snapshots/clones to track the changes over a period of the time. The incremental snapshots/clones may only include the delta. Thus, the incremental snapshots/clones avoid a full data transfer.

However, the amount of data that needs to be transferred with an incremental snapshot/clone depends on a "reference" snapshot/clone from which the delta is computed. In some cases, depending upon the reference snapshot/clone, delta may still be significant. Thus, to minimize the amount of data being transferred, the selection of an optimal reference snapshot/clone becomes key. In some embodiments, different files in a snapshot at the source site may have references in different snapshots at the target site. Logic to select the reference snapshot/clone may be easier in a single namespace, but as the number of namespaces increase, the reference snapshot/clone selection logic becomes increasingly difficult and complex. Over time, millions of snapshots/clones may be created, but only few of those snapshots may be retained (e.g., only monthly or yearly snapshots may be retained). Thus, some intermediate snapshots/clones may get deleted over time, leading to disconnected snapshot/clone hierarchy. Such disconnected snapshot/clone hierarchy may further complicate the reference selection logic.

The present disclosure, therefore, provides technical solutions for an efficient and convenient mechanism to select an optimal reference snapshot/clone for replicating snapshots/clones from a source site to a target site. Specifically, the present disclosure provides a mechanism to identify a list of potential reference snapshots/clones and then determine an optimal reference snapshot/clone from the list of potential reference snapshots/clones to keep delta as minimal as possible. The selection of the potential reference snapshots/clones may be facilitated by maintaining a chain hierarchy of snapshots/clones. The technical solution of the present disclosure is suitable for determining an optimal reference for a single namespace or multiple namespaces. The technical solution of the present disclosure also works with disconnected snapshot/clone hierarchy where intermediate snapshots/clones may have been deleted over time without requiring storage of metadata of the deleted snapshots/clones. Reference snapshots/clones may be selected from ancestor snapshots/clones (e.g., previously captured snapshots/clones) and/or descendent snapshots/clones (e.g., snapshots/clones captured in the future). Thus, the present disclosure improves the operation of the virtualized environment by providing a capability of selecting optimal reference snapshots/clones to minimize the amount of data being transferred for replication.

It is to be understood that the present disclosure is described mostly with respect to virtual machines. However, the present disclosure is also applicable to other types of entities defined herein that are desired to be snapshotted/cloned.

Referring now to FIG. 1, a cluster 100 of a virtual computing system is shown, in accordance with some embodiments of the present disclosure. The cluster 100 may be considered a hyperconverged cluster. Further, the virtual computing system may be organized into a source site and a target site. Each of the source site and the target site may include one or more clusters (e.g., similar to the cluster 100). Data from the source site may be backed up or replicated to the target site. Thus, the site from which data is transferred is the source site and the site to which the data is transferred is the target site. The cluster 100 (whether on the source site or the target site) includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the cluster 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two user VMs (e.g., the user VMs 120, the user VMs 135, and the user VMs 150) are shown on each of the first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks or vdisks for access by the user VMs 120, the user VMs 135, and the user VMs 150.

Each of the user VMs 120, the user VMs 135, and the user VMs 150 is a software-based implementation of a computing machine. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. For example, each of the hypervisor 125, the hypervisor 140, and the hypervisor 155 may allocate memory and other resources to the underlying user VMs (e.g., the user VMs 120, the user VMs 135, and the user VMs 150) from the storage pool 170 to perform one or more functions.

By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new user VMs are created (e.g., installed) on the first node 105, the second node 110, and the third node 115, each of the new user VMs may be configured to be associated with certain hardware resources, software resources, storage resources, and other resources within the cluster 100 to allow those virtual VMs to operate as intended.

The user VMs 120, the user VMs 135, the user VMs 150, and any newly created instances of the user VMs are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the cluster 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 is associated with a central management system that is configured to manage and control the operation of multiple clusters in the virtual computing system. In some embodiments, the central management system may be configured to communicate with local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
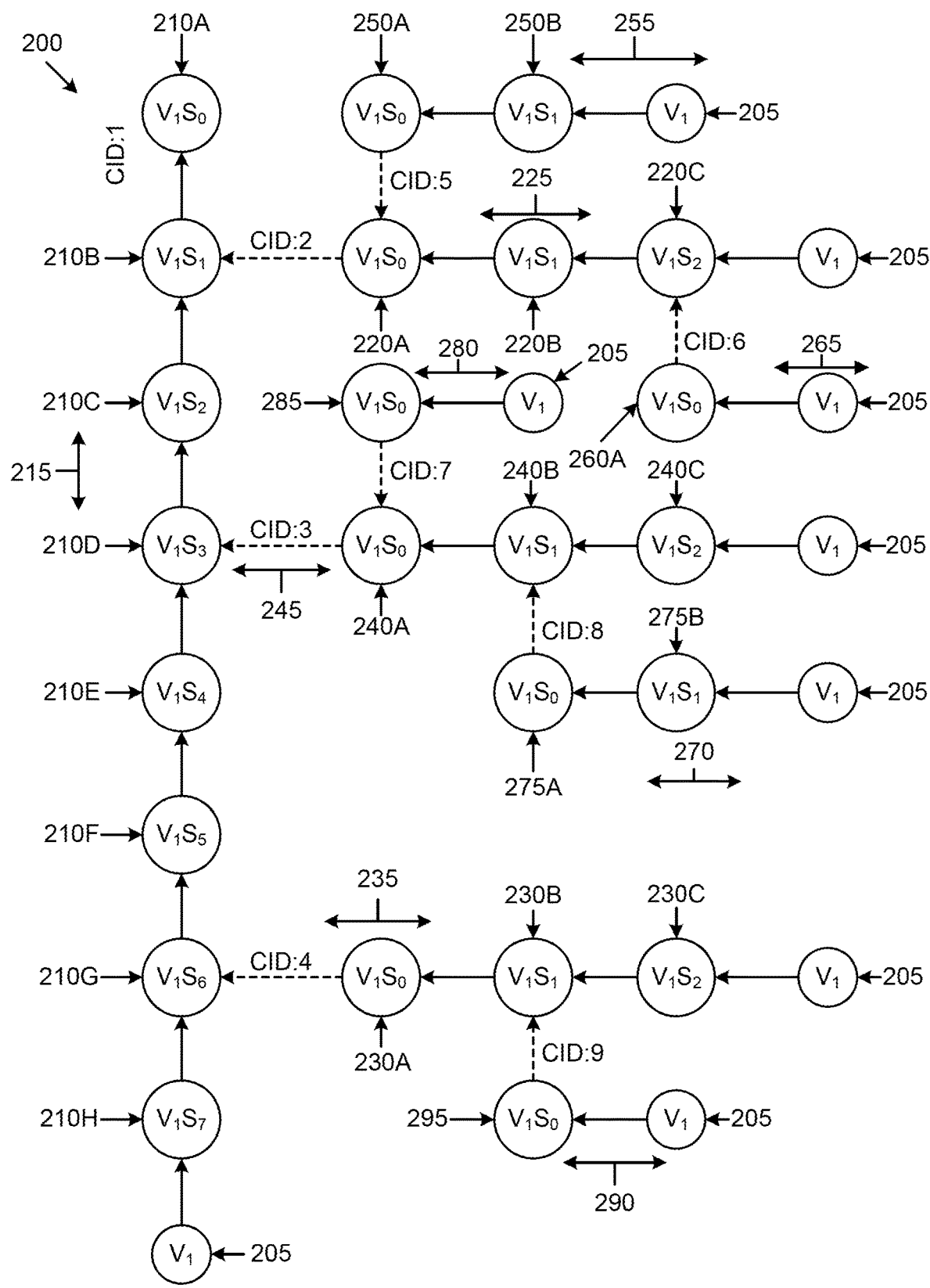
FIG. 2 is an example diagram showing a virtual disk hierarchy in the virtualized environment of FIG. 1, in accordance with some embodiments of the present disclosure.

Turning now to FIG. 2, a virtual disk hierarchy 200 is shown, in accordance with some embodiments of the present disclosure. Each "circle" in the virtual disk hierarchy 200 is representative of one or more virtual disks associated with an entity. Specifically, each circle in the virtual disk hierarchy 200 is either a snapshot of the one or more virtual disks or a clone of the one or more virtual disks. In particular, the virtual disk hierarchy 200 is for the one or more virtual disks of a base entity 205. Specifically, from the base entity 205, and particularly, from an image or the one or more vdisks of the base entity, one or more snapshots and one or more clones may be created to generate the virtual disk hierarchy 200. For example, from the base entity 205, snapshots 210A-210H may be created. Thus, each of the snapshots 210A-210H may be a snapshot of the one or more virtual disks associated with the base entity 205 taken at a particular point in time. Further, the snapshot 210H may be a child snapshot of the snapshot 210G, which may be a child snapshot of the snapshot 210F, which in turn may be a child snapshot of the snapshot 210E, and so on. In other words, each child snapshot may be created after its parent snapshot. Thus, for example, the snapshot 210A may be created from the base entity 205 at a first point in time. The snapshot 210B may be created from the base entity 205 at a second point in time that is after the first point in time. Thus, the snapshot 210A may be considered a parent snapshot to the snapshot 210B and the snapshot 210B may be considered a child snapshot of the snapshot 210A. Although eight snapshots (e.g., the snapshots 210A-210H) are shown of the base entity 205, in other embodiments, greater than or fewer than eight snapshots may be taken from the base entity. The virtual disk hierarchy 200 is simply an example and is not intended to be limiting in any way. The snapshots 210A-21H captured from the base entity 205 may be associated with a namespace 215.

In some embodiments, one or more clones may be created from the base entity 205. In some embodiments, a clone may be created from a particular snapshot of the base entity 205. For example, and as shown in the virtual disk hierarchy 200, the snapshot 210B may be cloned to create a clone 220A. Snapshots 220B and 220C may be created from the clone 220A. Thus, the snapshot 220C is a child snapshot of the snapshot 220B, which is turn is a child snapshot of the clone 220A. The clone 220A, the snapshots 220B, 220C, and any other snapshots created from the clone 220A may form a namespace 225. Thus, each time a new clone is generated, a new namespace is created. Similarly, from the snapshot 210G, a clone 230A may be created and from that clone, snapshots 230B and 250C may be created. The snapshot 230C may be a child snapshot of the snapshot 230B, which in turn may be a child snapshot of the clone 230A. The clone 230A, the snapshots 230B, 230C, and any other snapshots created from the clone may form a namespace 235. From the snapshot 210D, a clone 240A may be created. Snapshots 240B and 240C may be created from the clone 240A. The snapshot 240C may be a child snapshot of the snapshot 240B, which in turn may be a child snapshot of the clone 240A. The clone 240A, the snapshots 240B, 240C, and any other snapshots created from the clone may form a namespace 245.

Although the snapshots 210A, 210C, 210E, 210F, and 210H are not shown as having any clones created therefrom, in other embodiments, one or more of those snapshots may also have clones, and snapshots may be created from those clones to create new namespaces. Generally speaking, any snapshot in the virtual disk hierarchy 200 may be cloned to create a new namespace. From that clone, additional snapshots may then be created. Further, although each of the namespaces 225, 235, and 245 have been shown as having two snapshots each (not including the clone), in other embodiments, the number of snapshots in one or more of those namespaces may vary. Again, the number of clones, the snapshots from which clones are created, and the number of snapshots in each namespace may vary from one embodiment to another. In some embodiments, a clone may have no snapshots. Further, although the reference numerals 220A, 230A, and 240A are referred to herein as "clones," those "clones" may in fact be snapshots of the "clones" that are created from the base snapshot (e.g., the snapshots 210B, 210G, 210D, respectively).

Further, additional clones may be created from namespaces of clones. For example, and as shown in the virtual disk hierarchy 200, a clone 250A may be created from the clone 220A to create a new namespace 255. Snapshot 250B may be created from the clone 250A. Although the clone 250A is created from the clone 220A, in some embodiments, the clone 250A may instead be created from the snapshot 220B or the snapshot 220C. Further, although the clone 250A is shown as having a single snapshot (e.g., the snapshot 250B), in other embodiments, additional snapshots may be created from that clone.

Similarly, the snapshot 220C may be cloned to create a clone 260A from which snapshots may be taken to form a new namespace 265. Although the clone 260A is created from the snapshot 220C, in some embodiments, the clone 260A may instead be created from the clone 220A or the snapshot 220B. Further, although the clone 260A is shown as having no snapshots, in other embodiments, snapshots may be created from that clone. Likewise, the virtual disk hierarchy 200 shows a namespace 270. The namespace 270 may be created by creating a clone 275A from the snapshot 240B. Snapshot 275B may be created from the clone 275A. Although the clone 275A is created from the snapshot 240B, in some embodiments, the clone 275A may instead be created from another snapshot in the namespace 245 or from the clone 240A. Further, although the clone 275A is shown as having a single snapshot (e.g., the snapshot 275B), in other embodiments, additional snapshots may be created from that clone. A namespace 280 may also be created from the namespace 245. The namespace 280 may include a clone 285 created from the clone 240A. Although the clone 285 is created from the clone 240A, in some embodiments, the clone 285 may instead be created from a snapshot of the namespace 245. Further, although the clone 285 is shown as having no snapshots, in other embodiments, snapshots may be created from that clone. Namespace 290 may be created from the namespace 235. Particularly, a clone 295 may be created from the snapshot 230B. Although the clone 295 is created from the snapshot 230B, in some embodiments, the clone 295 may instead be created from the clone 230A or any of the other snapshots on the namespace 235. Further, although the clone 295 is shown as having no snapshots, in other embodiments, snapshots may be created from that clone.

All of the clones and all of the snapshots in the virtual disk hierarchy 200 are ultimately descendants of the base entity 205. It is to be understood that the number of namespaces, the snapshots from which the cloned snapshots are formed, and the number of snapshots in each namespace may all vary in other embodiments from that shown. Further, although the child-parent relationship is not explained for each namespace, generally speaking, the notation in the format of $V_iS_j$ within each "circle" of the virtual disk hierarchy 200 in FIG. 2 indicates that the particular circle represents a snapshot or clone, $S_j$, of one or more vdisks, $V_i$. Two "circles" that are connected by a solid line indicate that $V_iS_{j+1}$ is a child snapshot of $V_iS_j$. Two "circles" that are connected by a dashed line indicate that $V_iS_0$ is a clone of a snapshot $V_iS_j$ or another clone $V_iS_0$.

Further, a first snapshot/clone may be a "descendant" of a second snapshot/clone if the first snapshot/clone is created after the second snapshot/clone regardless of the namespace to which each of the first snapshot/clone and the second snapshot/clone belong. In contrast, a first snapshot/clone may be an "ancestor" of a second snapshot/clone if the first snapshot/clone is created before the second snapshot/clone regardless of the namespace to which each of the first snapshot/clone and the second snapshot/clone belong. For example, the snapshot 240B may be considered a descendant of the clone 240A and the snapshot 210D since the snapshot 240B is created after the creation of the clone 240B and the snapshot 210D. The clone 240B and the snapshot 210D may be considered ancestors of the snapshot 240B since the clone 240B and the snapshot 210D were created before the snapshot 240B. Similarly, since the snapshot 240B is created after the snapshot 210C, the snapshot 240B may be considered a descendant of the snapshot 210C and the snapshot 210C may be considered an ancestor of the snapshot 240B. If the snapshot 240B is created after the creation of the snapshot 220B, then the snapshot 240B may be considered a descendant of the snapshot 220B and the snapshot 220B may be considered an ancestor of the snapshot 240B. Thus, descendants and ancestors may span multiple namespaces.

Any number of namespaces, including any number of snapshots in each namespace, may be present within the virtual disk hierarchy 200. The virtual disk hierarchy 200 may be stored within the storage pool 170 and may be used to identify a changed data (e.g., delta) between two snapshots or between a snapshot and a clone to minimize the amount of data being transferred to a target site. Further, the virtual disk hierarchy 200 may be considered dynamic in nature. In other words, as more snapshots and/or clones of the base entity 205 are created, the structure of the virtual disk hierarchy 200 may change. Similarly, when one or more snapshots and/or clones of the base entity 205 are deleted, the structure of the virtual disk hierarchy 200 may change.

Over time, some snapshots and/or clones may be deleted. Deleted snapshots/clones may lead to breaks or disconnects within the virtual disk hierarchy 200. Thus, over a period of time, the virtual disk hierarchy 200 originating from the same base entity (e.g., the base entity 205) may end up having disconnected namespaces. With breaks or disconnects in the virtual disk hierarchy 200, finding a reference snapshot/clone to compute the delta becomes difficult. For example, if the snapshot 220B is deleted over time, in some embodiments, the delta for replicating the snapshot 220C may be computed based on the clone 220A. However, there may be another snapshot within the virtual disk hierarchy 200 that may be better reference snapshot for replicating the snapshot 220C. In other words, the delta for the snapshot 220C computed based on another reference snapshot may be smaller than the delta computed based on the clone 220A. In some embodiments, the clone 220A may also have been deleted. In such cases, the reference snapshot for replicating the snapshot 220C may be unknown and the snapshot 220C may be fully transferred to the target site, thereby increasing the amount of data being transferred. The present disclosure takes advantage of the virtual disk hierarchy 200 in determining an optimal reference snapshot regardless of the breaks or disconnects in the virtual disk hierarchy. With the present disclosure, even if the clone 220A and the snapshot 210B are deleted, an optimal reference snapshot that minimizes the delta for the snapshot 220C may still be found.

Figure 3:
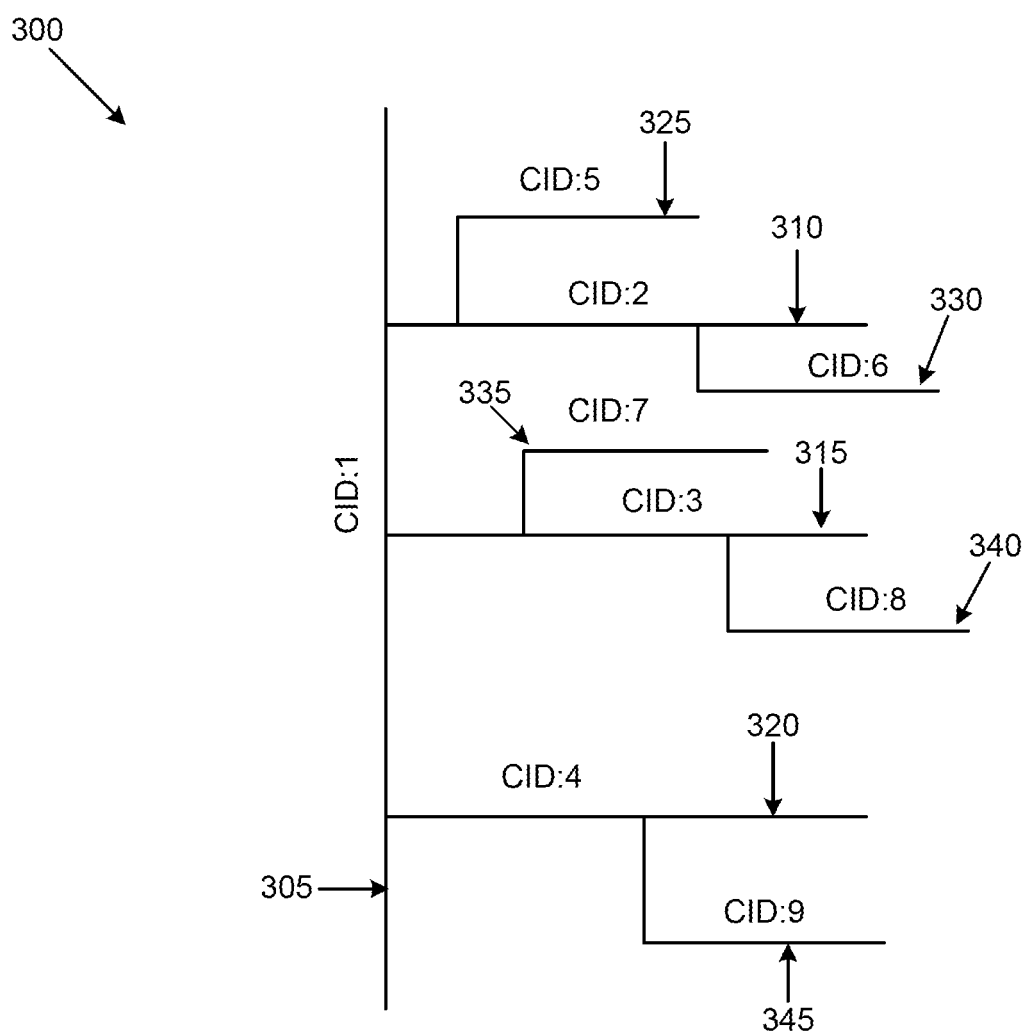
FIG. 3 is an example diagram showing a chain hierarchy corresponding to the virtual disk hierarchy of FIG. 2, in accordance with some embodiments of the present disclosure.

Specifically, the present disclosure assigns each namespace a chain identification number or CID (also referred to herein as Group ID) to create a chain hierarchy from the virtual disk hierarchy 200. Referring to FIG. 3 in conjunction with FIG. 2, an example chain hierarchy 300 for the virtual disk hierarchy 200 is shown, in accordance with some embodiments of the present disclosure. Each namespace in the virtual disk hierarchy 200 is assigned a unique CID in the chain hierarchy 300. For example, in some embodiments, the namespace 215 may be assigned a CID 305 or CID:1, the namespace 225 may be assigned a CID 310 or CID:2, and the namespace 245 may be assigned a CID 315 or CID:3. Similarly, the namespaces 235, 255, 265, 280, 270, and 290 may be assigned a CID 320 (CID:4), 325 (CID:5), 330 (CID:6), 335 (CID:7), 340 (CID:8), and 345 (CID:9), respectively. Each CID may be representative of all the snapshots, including the clone, in a particular namespace. Each time a new namespace is created, a new CID may be assigned to that namespace and stored in the chain hierarchy 300. In other words, each time a new clone is created, a new CID is created. Further, each snapshot in a particular namespace and the clone in that namespace has the same CID. Even if a particular snapshot in a particular namespace is deleted or the clone of that namespace is deleted, the CID of that namespace is not impacted. In some embodiments, the CID may be continuously updated as more clones/snapshots are created.

Each CID may track a parent CID as well as all children CID. Parent CID may include the namespace from which a particular CID originated. For example, the CID 305 is the parent CID for the CIDs 310, 315, and 320 since the namespaces 225, 245, and 235, respectively, originated from the namespace 215 of the CID 305. The CIDs 310, 315, and 320 may be considered children CID of the parent CID (e.g., the CID 305). Thus, the CID 325 and the CID 330 may be children CID of the CID 310 and the CID 310 may be the parent CID of the CID 325 and 330. Thus, each CID may track its parent CID and all children CID. In some embodiments, each CID may also track additional information. For example, in some embodiments, one or more CID may track an "originating disk." The originating disk may correspond to the one or more vdisks from which a new namespace is created. For example, the namespace 225, which is represented by the CID 310, is created from the snapshot 210B. Thus, for the CID 310, the one or more vdisks associated with the snapshot 210B may form the originating disk for the CID 310.

In some embodiments, one or more CID may track a chain creating time ("CCT"). CCT may define when a particular namespace is created. In other words, the CCT is the time when the clone in the particular namespace is created. For example, for the CID 310, the CCT may be the time when the clone 220A is generated. The CCT may be used to compute a relative time distance, as discussed in greater detail below. In some embodiments, one or more CID may also track an originating vdisk snapshot time ("OVST"). OVST may be the time at which the originating disk is snapshotted. For example, for the CID 310, OVST is the time at which the snapshot 210B is created. In other embodiments, one or more CID may track other or additional information.

In some embodiments, the information being tracked by each CID may be stored in a data structure (e.g., table, list, etc.) and stored within the storage pool 170 along with the chain hierarchy 300. In some embodiments, the data structure may be a chain configuration data structure storing the "chain configuration data" such as parent CID, children CID, OVST, CCT, originating disk, etc. By tracking the above information, the chain hierarchy 300 is able to find an optimal reference even when certain snapshots or clones are deleted from the virtual disk hierarchy 200. In some embodiments, each CID may also track the timestamp at which a particular snapshot of that CID is generated. For example, in some embodiments, for the CID 310, the chain configuration data may also include the timestamps at which the snapshots 220B and 220C are created. In other embodiments, the chain configuration data may include other details. As new snapshots and namespaces are created, the chain configuration data may be updated. For example, when a new namespace is created from a particular CID, the chain configuration data of that CID may be updated to include the CID assigned to the new namespace. The amount of space consumed by a CID may be considered minimal compared to the amount of space consumed by user data stored in vdisks.

Figure 4:
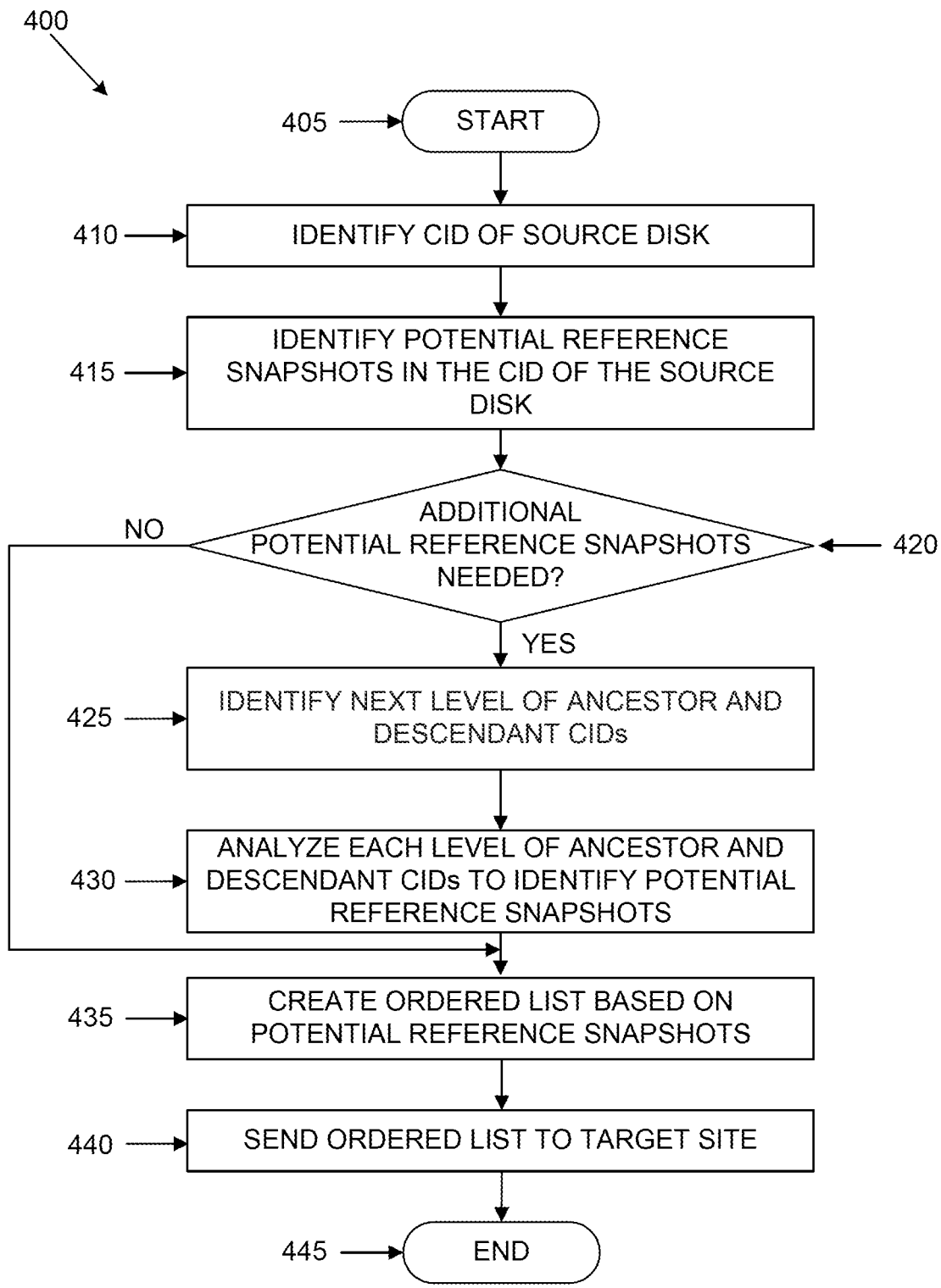
FIG. 4 is an example flowchart outlining operations for creating a list of reference disks by a source site for replicating data from the source site to a target site, in accordance with some embodiments of the present disclosure.

Turning now to FIG. 4, an example flowchart outlining a process 400 is shown, in accordance with some embodiments of the present disclosure. The process 400 may include additional, fewer, or different operations, depending on the particular embodiment. The process 400 is discussed in conjunction with FIGS. 2 and 3. The process 400 may be implemented by the controller/service VM of a designated node on a source site or by a dedicated controller configured to facilitate replication/back-up operations on the source site. The process 400 may be used to identify a list of potential reference snapshots from which the delta may be computed. The process 400 may also be used to sort the list of potential reference snapshots to create an ordered list and facilitate selection of an optimal reference snapshot. Even though the process 400 is discussed with respect to "snapshots," the process 400 is also intended to include "clones." Thus, the term "snapshot" in the discussion of FIG. 4 is collectively used for referring to both "snapshots" and "clones."

Thus, the process 400 starts at operation 405 upon receiving an indication to backup or replicate a particular snapshot in the virtual disk hierarchy 200. For example, in some embodiments, the process 400 may start upon receiving an identity of one or more virtual disks to be replicated from the source site to the target site. In other embodiments, the process 400 may start upon receiving an identity of one or more snapshots to be replicated to the target site. In other embodiments, the process 400 may start upon receiving another type of indication for data replication. Upon receiving the indication, the controller/service VM or the designated controller may determine the CID associated with the one or more virtual disks/snapshots that are to be replicated at operation 410. In some embodiments, a mapping of each virtual disk and its associated CID may be maintained. Thus, using the mapping, the CID associated with the identified one or more virtual disks may be determined. For purposes of explanation only, the description below is with respect to replicating the snapshot 240B (e.g., the one or more vdisks associated with the snapshot 240B) of the CID 315. However, the process 400 may be used to replicate any snapshot in the virtual disk hierarchy 200. The snapshot being replicated may be called a source snapshot. The vdisk(s) associated with the source snapshot may be called a source vdisk. The CID associated with the source snapshot may be referred to as the source CID.

At operation 415, the controller/service VM or the designated controller analyzes the other snapshots having the same CID as the source CID. As indicated above, multiple snapshots may be associated with a namespace and all snapshots in a particular namespace may have the same CID. Thus, the controller/service VM or the designated controller may determine if other snapshots exist in the same namespace as the source snapshot. If other snapshots having the same CID as the source snapshot are available, those available snapshots may be considered potential reference snapshots from which delta may be computed for replicating the source snapshot to the target site. For example, the controller/service VM or the designated controller may identify the clone 240A and the snapshot 240*c* at the operation 415. At operation 420, the controller/service VM or the designated controller determines if additional potential reference snapshots are needed.

In some embodiments, the number of potential reference snapshots to be identified may be pre-defined and programmed within the controller/service VM or the designated controller. At the operation 420, the controller/service VM or the designated controller may determine if the number of potential reference snapshots identified at the operation 415 are greater than or equal to that pre-defined number. For example, say the controller/service VM or the designated controller is programmed to identify 10 potential reference snapshots. At the operation 420, the controller/service VM or the designated controller may determine if 10 potential reference snapshots were identified at the operation 415. If less than 10 potential reference snapshots are identified at the operation 415, the process 400 proceeds to operations 425 and 430. In some embodiments, the number of potential reference snapshots identified at the operation 415 may be less than the pre-defined number because the namespace associated with the source snapshot may not have enough number of snapshots therein. In some embodiments, snapshots may have been deleted from the namespace resulting in fewer number of snapshots in the namespace than the pre-defined number.

Thus, if at the operation 420, the controller/service VM or the designated controller determines that additional potential reference snapshots are needed, at the operations 425 and 430, the controller/service VM or the designated controller determines the next level of ancestor and/or descendent CIDs associated with the source CID (e.g., the CID from which the source CID originated) and identifies additional potential reference snapshots. For example, the controller/service VM or the designated controller may determine the parent CID (e.g., ancestor CID) of the CID 315 that is associated with the source vdisk (e.g., the snapshot 240B). In some embodiments, the controller/service VM or the designated controller may determine the parent CID by analyzing (e.g., looking up) the chain configuration data of the CID 315 associated with the source vdisk (e.g., the snapshot 240B). As indicated above, the chain configuration data of a particular CID may store parent CID information. Thus, by reviewing the chain configuration data of a CID, the parent CID of the CID 315 may be determined. Thus, the controller/service VM or the designated controller may determine that the CID 305 is the parent CID of the source vdisk (e.g., the snapshot 240B). In some embodiments, the controller/service VM or the designated controller may also determine a child CID (e.g., a descendant CID) of the source vdisk. For example, the controller/service VM or the designated controller may identify the CID 340 as the descendant CID of the source vdisk.

Upon identifying the ancestor (e.g., parent) and/or descendant (e.g., child) CID, the controller/service VM or the designated controller may determine if the ancestor and/or the descendant CID have an available snapshot that may serve as a potential reference snapshot. If such a snapshot is available in the ancestor and/or descendant CID, the snapshots may be added to the list of potential reference snapshots. If additional snapshots are needed to satisfy the predetermined number of potential reference snapshots, the controller/service VM or the designated controller may move another level of the ancestor and/or descendant CID. For example, in some embodiments, the controller/service VM or the designated controller may identify at least one ancestor and/or descendant CID of the parent CID.

Specifically, the controller/service VM or the designated controller may analyze the chain configuration data of the CID 305 identified as the parent CID at the operation 410. From the chain configuration data of the parent CID (e.g., the CID 305), the controller/service VM or the designated controller may identify at least one descendant and/or at least one ancestor CID of the CID 305. For example, the controller/service VM or the designated controller may identify that the CID 310, the CID 315, and the CID 320 are descendants (e.g., children) CID of the CID 305. Although the CID 305 has no ancestor CID, if that CID had ancestors, those may also be identified. Similarly, in some embodiments, the controller/service VM or the designated controller may identify the ancestors and/or descendants of the child CID (e.g., the CID 340). Since the CID 315, which is ancestor of the CID 340 has already been identified and considered and since the CID 340 has no descendants, the controller/service VM or the designated controller may not be able to find any other potential reference snapshots from the CID 340. If the controller/service VM or the designated controller is unable to find the remaining number of potential reference snapshots that are needed from the next level of ancestors/descendants, the controller/service VM or the designated controller may move up/down another level.

For example, in some embodiments, the controller/service VM or the designated controller may identify grandparents and grandchildren of the parent CID (e.g., the CID 305). For example, in some embodiments, the controller/service VM or the designated controller may be configured to identity the CID 325, the CID 335, the CID 340, and/or the CID 345 as the grandchildren CID. The controller/service VM or the designated controller may identify the grandparent and/or grandchildren CID by reviewing the chain configuration data of each of the children CID. The controller/service VM or the designated controller may continue to traverse the CID hierarchy by identifying ancestors/descendants and finding available snapshots until the needed number of the potential references snapshots are found. In some embodiments, the number of levels of the chain hierarchy 300 to traverse at the operation 425 may be predetermined and configured within the controller/service VM or the designated controller.

In some embodiments, the controller/service VM or the designated controller may be configured to identify a number of potential reference snapshots determined based upon a difference between the total number of potential reference snapshots needed and the total number of potential reference snapshots identified at the operation 415. For example, if at the operation 415, 4 potential reference snapshots are found and the controller/service VM or the designated controller needs a total of 10 potential reference snapshots, the controller/service VM or the designated controller identifies 6 (10-4) additional potential reference snapshots from the ancestors and descendants of the source CID.

In other embodiments, the controller/service VM or the designated controller may identify all potential reference snapshots. In some embodiments, the controller/service VM or the designated controller may identify those snapshots as potential reference snapshots that are closest to the source vidsk (e.g., the snapshot 240B) and that are available (e.g., not deleted). Specifically, in some embodiments, the controller/service VM or the designated controller may traverse the available snapshots starting from the originating vdisk to identify the snapshots that are still available. For example, in some embodiments, the controller/service VM or the designated controller may determine (e.g., from the chain configuration data of the snapshot 240B) that the snapshot 210D is the originating vdisk (e.g., in the parent CID). If the originating vdisk is available, in some embodiments, the controller/service VM or the designated controller may add the originating disk as one of the potential reference snapshots. If the originating disk has been deleted or if additional potential reference snapshots are still needed, the controller/service VM or the designated controller may identify the parent CID and the children CID of the parent identified at the operation 425.

The controller/service VM or the designated controller may then determine if any available snapshots exist in the parent CID and the children CID of the parent CID. The controller/service VM or the designated controller may add any available snapshots found to the list of potential reference snapshots. For example, the controller/service VM or the designated controller may determine that the snapshots 210B-210G are all deleted. Thus, the controller/service VM or the designated controller may identify that the snapshot 210A and 210H are still available, and therefore, add those available snapshots to the list of potential reference snapshots. If the controller/service VM or the designated controller determines that additional potential reference snapshots are still needed, the controller/service VM or the designated controller may identify the grandparent and grandchildren CID of the parent CID identified at the operation 425, and find any available potential reference snapshots. In some embodiments, the controller/service VM or the designated controller may also traverse the children of the ancestors. Thus, the controller/service VM or the designated controller continues to traverse ancestors and/or descendants of the parent CID (e.g., from the operation 425) until the needed number of the potential reference snapshots have been identified.

By traversing the ancestors and/or descendants to identify the potential reference snapshots, the controller/service VM or the designated controller may be able to identify snapshots even if some intermediate snapshots have been deleted. The order in which the ancestors and descendants are traversed may also be configured within the controller/service VM or the designated controller. In other embodiments, the controller/service VM or the designated controller may be configured to identify the potential reference snapshots in other ways.

Since the source vdisk (e.g., the snapshot 240B) and all the potential reference snapshots are ultimately created from the base entity 205, at least some of the data between the source vdisk and each of the potential reference snapshots is common. In addition to compiling a list of potential reference snapshots (also referred to herein as reference vdisks), the process 400 also enables selecting one or more optimal reference snapshots from the list. A reference snapshot may be any snapshot which may be used to compute delta with the source vdisk. Specifically, a difference between the reference snapshot and the source vdisk may be computed to determine the changed data in the source vdisk with respect to the reference snapshot such that the changed data may be transferred to the target site for replication. In some embodiments, a reference snapshot may be an ancestor of (e.g., created before) the source vdisk. In other embodiments, the reference snapshot may be a descendant of (e.g., created after) the source vdisk. In some embodiments, the reference snapshot may have the same CID as the source vdisk. In other embodiments, the reference snapshot may have a different CID than the source vdisk. A reference snapshot is thus a snapshotted/cloned version of a vdisk which is available on both on the source site and the target site and has the same logical data. Data transfer of a source vdisk may be done by computing a difference (e.g., delta) between the reference snapshot and the source vdisk and sending the delta to the target site for replication.

Upon identifying the pre-defined number of potential reference snapshots, at operation 435, the controller/service VM or the designated controller determines a "closeness value" of each of the one or more potential reference snapshots to the source vdisk and creates an ordered list. The "closeness value" determines how different a particular snapshot's data is from the data of the source vdisk (e.g., the snapshot 240B). The closer a particular snapshot is to the source vdisk, the smaller is the difference between the data of that particular snapshot and the source vdisk. Smaller difference between the particular snapshot and the source vdisk means smaller delta, and smaller delta means less data transfer to the target site. Thus, the smaller the closeness value, the closer a particular snapshot is to the source snapshot. By determining the closeness value of each of the one or more potential reference snapshots to the source vdisk (e.g., the snapshot 240B), the controller/service VM or the designated controller may determine which potential reference snapshot may results in the smallest delta. Therefore, by determining the closeness values, the controller/service VM or the designated controller may facilitate determination of one or more optimal reference snapshots from the list of the potential reference snapshots.

In some embodiments, the controller/service VM or the designated controller may determine closeness value based on a "data distance." "Data distance" may determine the amount of changed data (e.g., delta) between the source vdisk (e.g., the snapshot 240B) and a particular potential reference snapshot. For example, in some other embodiments, the controller/service VM or the designated controller may compute a difference (e.g., a diff operation) between the source vdisk (e.g., the snapshot 240B) and the vidks(s) of each of the potential reference snapshots. The difference may determine the delta or change in data between the source vdisk and each of the one or more potential reference snapshots. The potential reference snapshot(s) resulting in the smallest delta may be considered closest to the source snapshot. In some embodiments, the controller/service VM or the designated controller may also determine the amount of changed data between the source vdisk (e.g., the snapshot 240B) and one or more snapshots (e.g., intermediate snapshots) that are located between the source snapshot and a particular reference snapshot.

For example, in some embodiments, say the snapshot 210D is a potential reference snapshot. To compute the data distance, the controller/service VM or the designated controller may compare the data stored in the vdisk associated with the snapshot 210D with the data stored in the vdisk associated with the source vdisk (e.g., the snapshot 240B) to determine the delta. In some embodiments, the controller/service VM or the designated controller may be configured to directly compare the snapshot 210D with the snapshot 240B to determine the delta. Further, in some embodiments, the controller/service VM or the designated controller may also compute delta between the clone 240A and the source vdisk (e.g., the snapshot 240B). The clone 240A may be considered an intermediate snapshot in that the clone 240A lies between the potential reference snapshot (e.g., the snapshot 210D) and the source vdisk (e.g., the snapshot 240B). By computing delta with one or more intermediate snapshots, the controller/service VM or the designated controller may identify a snapshot potentially having an even smaller delta compared to the potential reference snapshot.

In some embodiments, the controller/service VM or the designated controller may compute the delta with one or more intermediate snapshots by default. In other embodiments, the controller/service VM or the designated controller may be configured to first compute the delta with potential reference snapshots and then compute the delta with the intermediate snapshots of only those potential reference snapshots that have a delta below a certain threshold. In other embodiments, the controller/service VM or the designated controller may compute the data distance in other ways. A potential reference snapshot having the smallest "data distance" to the source vdisk (e.g., the snapshot 240B) maybe considered the closest to the source vdisk.

In yet other embodiments, the controller/service VM or the designated controller may be configured to compute closeness value using a "path distance." A "path distance" may compute the number of snapshots or vdisks that lie between the source vdisk (e.g., the snapshot 240B) and a potential reference snapshot. Computing "path distance" may be particularly advantageous if no intermediate snapshots between the source snapshot (e.g., the snapshot 240B) and the potential reference snapshot have been deleted. A potential reference snapshot that has the fewest number of vdisks between the potential reference snapshot and the source vdisk (e.g., the snapshot 240B) may be considered the closest to the source vdisk.

In some embodiments, the controller/service VM or the designated controller may be configured to compute closeness value using a "time distance." A "time distance" may compute a relative time difference between the source vdisk (e.g., the snapshot 240B) and a potential reference snapshot for which the source snapshot, the potential reference snapshot, and an intermediate snapshot has been open for update. The "time distance" approach may assume a constant change rate with respect to time. The "time distance" approach is discussed in greater detail in FIGS. 5 and 6 below. The potential reference snapshot having the smallest "time distance" to the source vdisk (e.g., the snapshot 240B) may be considered closest to the source vdisk.

In some embodiments, the controller/service VM or the designated controller may use a combination of "data distance," "path distance" and "time distance" for computing closeness values. In other embodiments, the controller/service VM or the designated controller may use other techniques to compute closeness value.

Upon computing closeness value of each of the potential reference snapshots to the source vdisk (e.g., the snapshot 240B), the controller/service VM or the designated controller creates an ordered list at the operation 435. Specifically, the controller/service VM or the designated controller may sort the potential reference snapshots based upon closeness value such that the potential reference snapshot that is closest to the source vdisk (e.g., has the smallest closeness value) is at the top of the list and the potential reference snapshot that is farthest away in terms of closeness (e.g., has the largest closeness value) to the source vdisk is at the bottom of the list. In other words, the potential reference snapshot that is at the top of the list has the highest priority and the potential reference snapshot that is at the bottom of the list has the lowest priority. At operation 440, the controller/service VM or the designated controller sends the ordered list to the target site. The target site then determines which snapshot from the ordered list has previously been replicated to the target site and designates that snapshot as a reference snapshot, as discussed in greater detail in FIG. 7. The process 400 ends at operation 445 waiting for another indication to replicate another snapshot.

Figure 5:
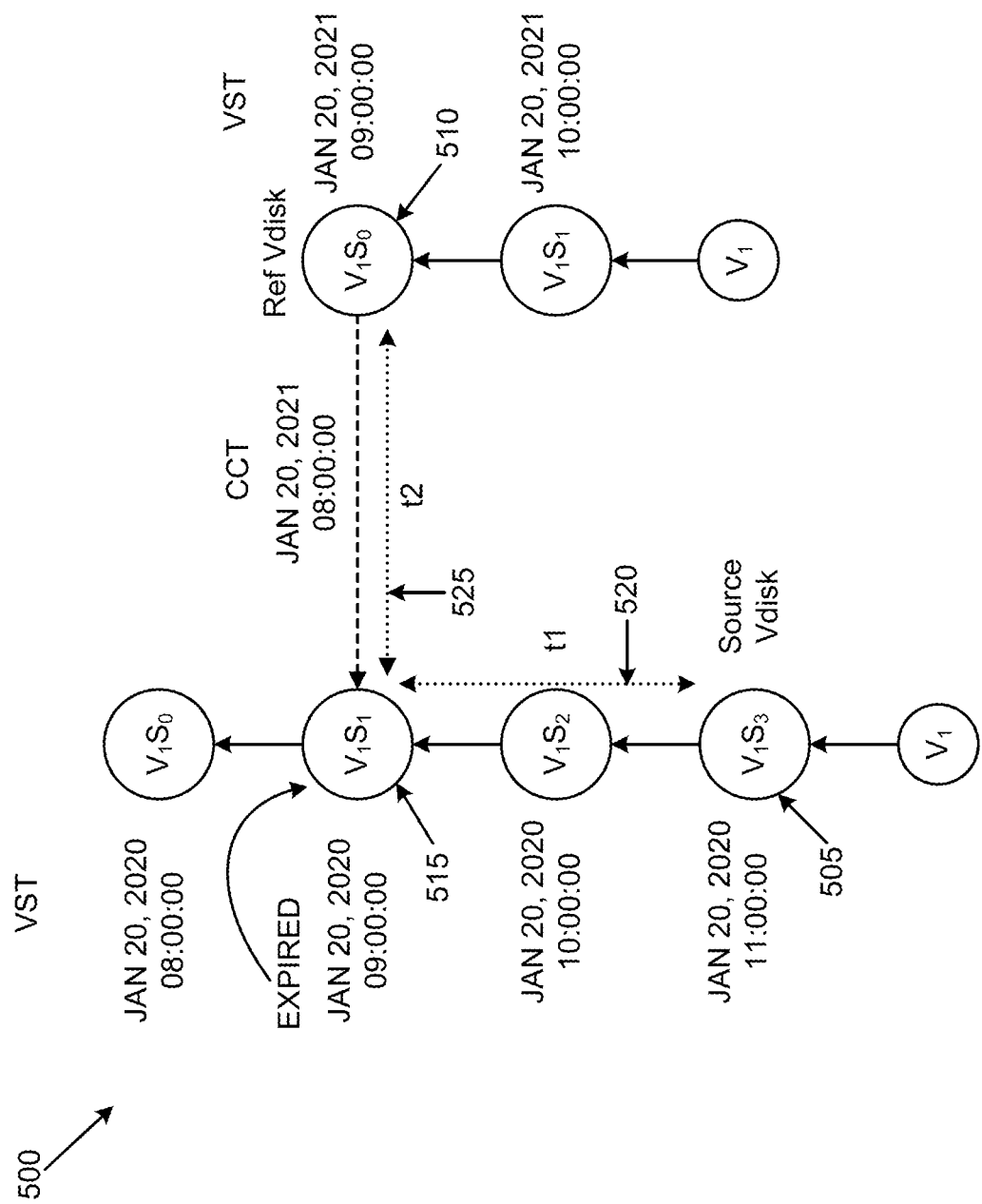
FIG. 5 is an example diagram showing computation of closeness of a reference disk to a source disk on the source site, in accordance with some embodiments of the present disclosure.

Turning to FIG. 5, an example diagram showing computation of a time distance between a source vdisk and a potential reference snapshot in a virtual disk hierarchy 500 is shown, in accordance with some embodiments of the present disclosure. Specifically, FIG. 5 shows how to compute a time distance between a source vdisk 505 and a potential reference snapshot 510 (e.g., potential reference vdisk) of the virtual disk hierarchy 500. The example of FIG. 5 further assumes that snapshot 515 has been expired or deleted leading to a break in the virtual disk hierarchy 500. Since the snapshot 515 is the originating disk for the potential reference snapshot 510, the chain configuration data of the potential reference snapshot may store the OVST of the snapshot 515. The OVST may be used to compute the time distance between the source vdisk 505 and the potential reference snapshot 510.

Specifically, to compute the time distance between the source vdisk 505 and the potential reference snapshot 510, a time period, t1, 520 between the source vdisk and the snapshot 515, as well as a time period, t2, 525 between the snapshot 515 and the potential reference snapshot 510 may be computed. The time period, t1, 520 and the time period, t2, 525 may be computed as follows:

$$t1 = \text{Source } V\text{disk Snapshot Time (SVST)} - \text{OVST}$$

$$t2 = \text{Reference } V\text{disk Snapshot Time (RVST)} - \text{CCT}$$

SVST is the time when the source vdisk 505 is created and RVST is the time when the potential reference snapshot 510 is created. Specifically, SVST is the time when the vdisk associated with the source vdisk 505 is snapshotted and the RVST is the time when the vdisk associated with the potential reference snapshot 510 is snapshotted.

Say for example, SVST is 11:00:00 and OVST is 09:00:00, as shown in FIG. 5. Applying the formula above for t1, the time period, t1, 520 is 11:00:00-09:00:00=2 hours. Similarly, say CCT is 08:00:00 and RVST is 09:00:00, as shown in FIG. 5. Applying the formula above for t2, the time period, t2, 525 is 09:00:00-08:00:00=1 hour. The time distance may then be computed as t1+t2. Thus, using the example above, the time distance=2+1=3 hours.

Figure 6:
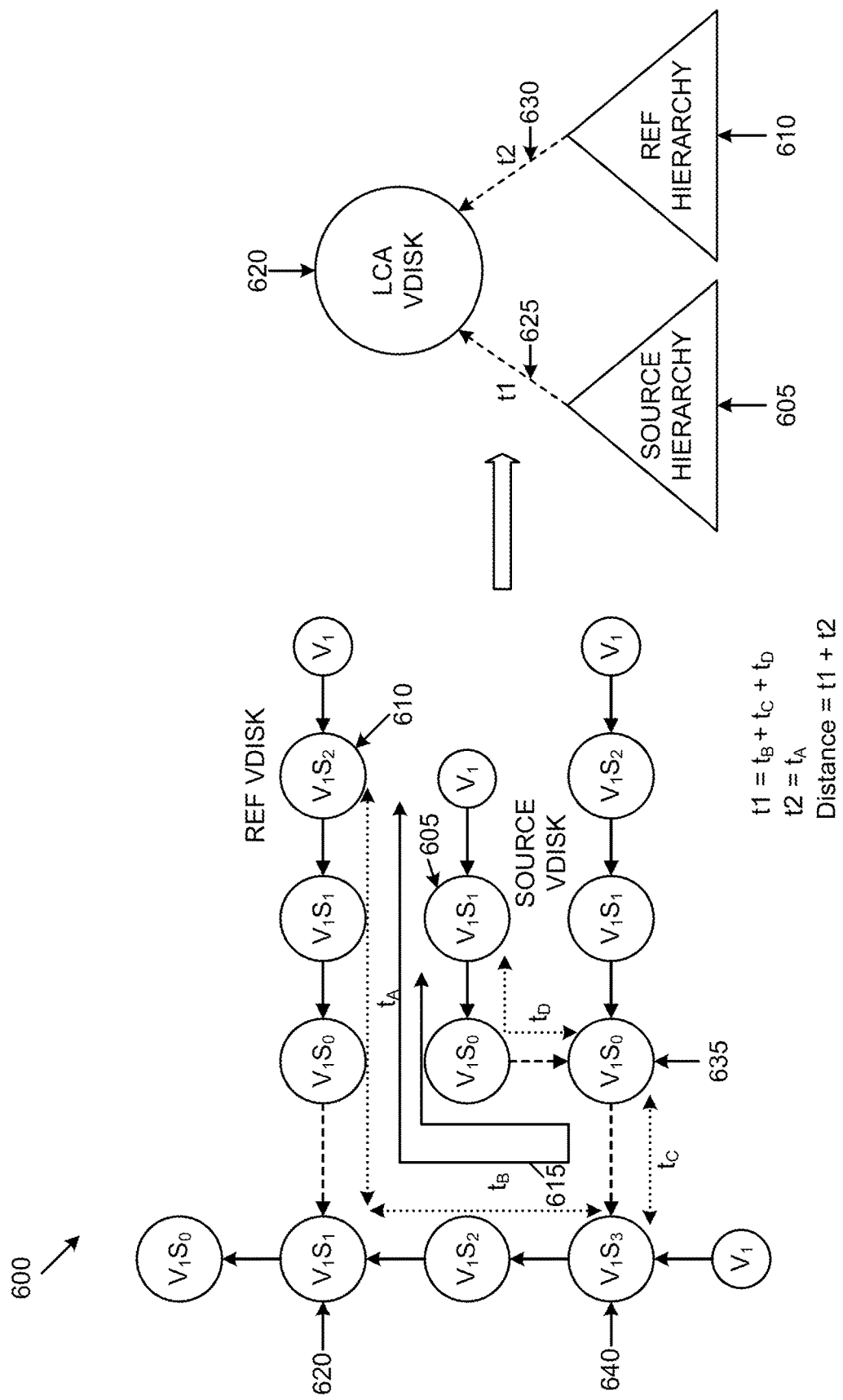
FIG. 6 is another example diagram showing computation of closeness of a reference disk to a source disk on the source site, in accordance with some embodiments of the present disclosure.

Turning to FIG. 6, an example diagram showing computation of a time distance between a source vdisk and a potential reference snapshot in a virtual disk hierarchy 600 is shown, in accordance with some embodiments of the present disclosure. Specifically, FIG. 6 shows how to compute a time distance between a source vdisk 605 and a potential reference snapshot 610 (e.g., potential reference vdisk) of the virtual disk hierarchy 600. To compute the time distance between the source vdisk 605 and the potential reference snapshot 610, a path 615 from the source vdisk to the potential reference snapshot is identified. A vdisk in the path 615 that is common to both the source vdisk 605 and the potential reference snapshot 610 may be identified. For example, in FIG. 6, snapshot 620 may be considered a common snapshot between the source vdisk 605 and the potential reference snapshot 610 because the snapshot 620 is the originating disk for the potential reference snapshot 610 and the source vdisk 605 ultimately descends from the snapshot 620.

Upon identifying the common snapshot (e.g., the snapshot 620), a time period, t1, 625 between the source vdisk 605 and the common snapshot (e.g., the snapshot 620), as well as a time period, t2, 630 between the potential reference snapshot 610 and the common snapshot may be determined. The time distance, t, may then be equal to the sum of the time period, t1, 625 and the time period, t2, 630. For example, in FIG. 6:

$$t1=tb+tc+td$$

$$t2=ta$$

$$t=t1+t2$$

In the formulae above, ta may be determined based on a difference between RVST of the potential reference snapshot 610 and CCT when the namespace associated with the potential reference snapshot was created. Similarly, td may be determined based on a difference between SVST of the source vdisk 605 and CCT when the namespace associated with the source snapshot was created; tc may be based on a difference between a snapshot creation time of the snapshot 635 and CCT when the namespace associated with the snapshot 635 was created; and tb may be based on a difference between the snapshot creation time of snapshot 640 and OVST (e.g., the snapshot creation time of the snapshot 620).

The various snapshot creation times mentioned above, including, RVST, CCT, OVST, SVST, may be determined from the chain configuration data of respective snapshots. For example, RVST, OVST, and CCT may be determined based on the chain configuration data of the potential reference snapshot 610. SVST may be determined based upon the chain configuration data of the source vdisk 605, and so on. By determining the various snapshot creation times from the chain configuration data, those times may be determined even if any of the respective snapshots have been deleted.

Figure 7:
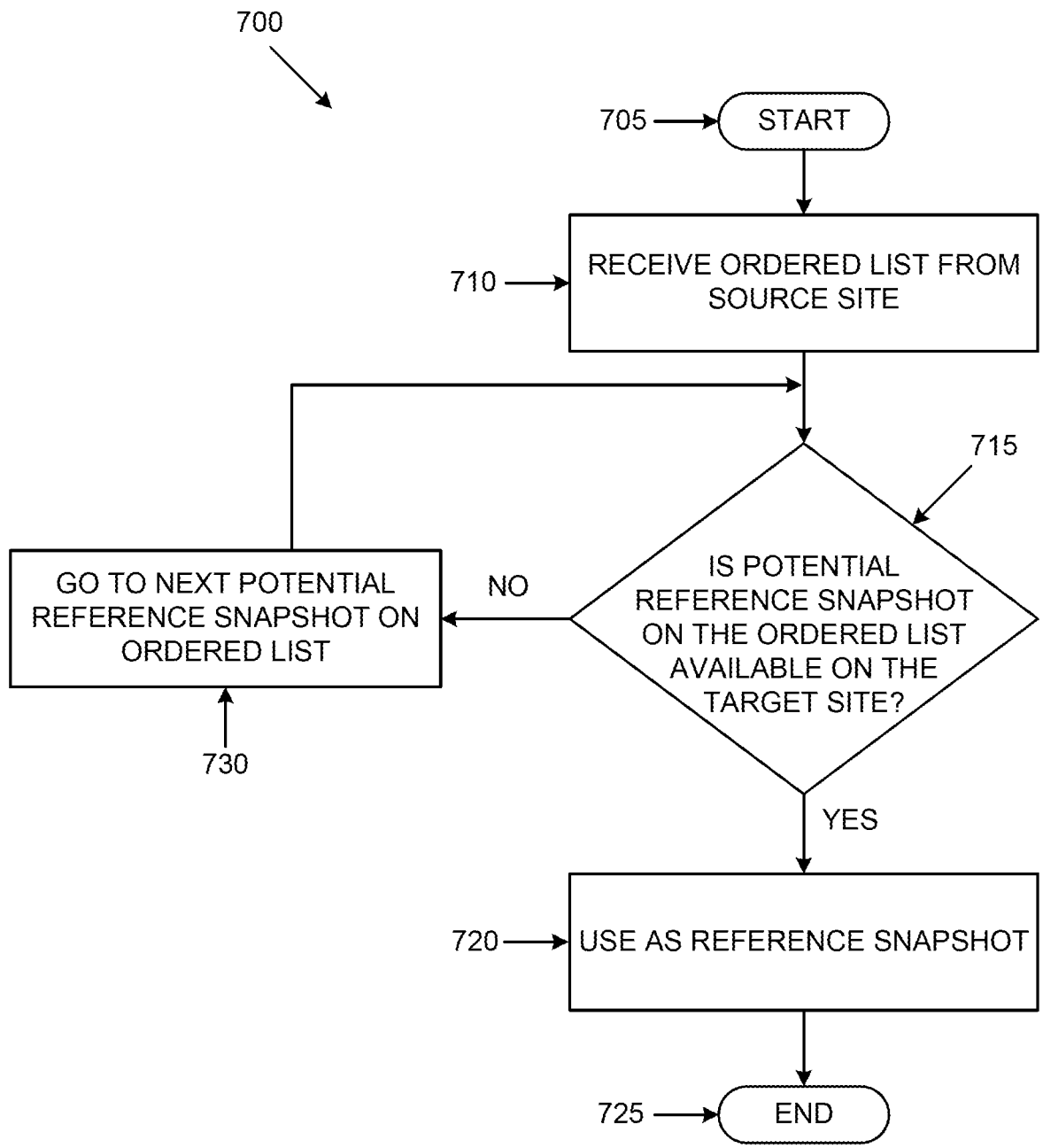
FIG. 7 is an example flowchart outlining operations for determining an optimal reference disk at a target site based on the list of reference disks of FIG. 4, in accordance with some embodiments of the present disclosure.

Referring now to FIG. 7, an example flowchart outlining a process 700 is shown, in accordance with some embodiments of the present disclosure. The process 700 may include additional, fewer, or different operations, depending on the particular embodiment. The process 700 is discussed in conjunction with FIGS. 2 and 3. The process 700 may be implemented by the controller/service VM of a designated node on the target site or by a dedicated controller configured to facilitate replication/back-up operations on the target site. The process 700 starts at operation 705 with the target site receiving the ordered list from the source site at operation 710. The ordered list received by the target site at the operation 710 is the same ordered list sent by the source site at the operation 440. Upon receiving the ordered list, the controller/service VM or the dedicated controller analyzes each potential reference snapshot on the ordered list to determine which of those snapshots have already been replicated on the target site. Since the ordered list may be sorted such that the closest potential reference snapshot is at the top of the list, in some embodiments, the controller/service VM or the dedicated controller on the target site starts analyzing the ordered list starting with the potential reference snapshot that is at the top of the list (e.g., with the closest potential reference snapshot). By analyzing the potential reference snapshots in the order in which those snapshots are listed in the ordered list, the controller/service VM or the dedicated controller identifies the reference snapshot that is closest to the source snapshot and already replicated on the target site.

Thus, at operation 715, starting with the first potential reference snapshot (e.g., the potential reference snapshot at the top of the ordered list), the controller/service VM or the dedicated controller determines whether that first potential reference snapshot is available on the target site. In some embodiments, snapshots replicated to the target site may have been deleted. Such deleted snapshots may not form a basis for computing delta. Thus, the controller/service VM or the dedicated controller may determine whether the first potential reference snapshot has been replicated to the target site and is available (e.g., not deleted). If the controller/service VM or the dedicated controller determines that the first potential reference snapshot is available on the target site, the controller/service VM or the dedicated controller designates the first potential reference snapshot as the reference snapshot at operation 720 since the first potential reference snapshot is closest to the source snapshot and results in a smallest delta. The controller/service VM or the dedicated controller then does not need to analyze the remaining potential reference snapshots on the ordered list and the process 700 ends at operation 725. If at the operation 715, the controller/service VM or the dedicated controller determines that the first potential reference snapshot is not available on the target site, the process 700 proceeds to operation 730 at which the second potential reference snapshot on the ordered list is analyzed. The process 700 thus repeats the operations 715-730 for each potential reference snapshot on the ordered list until a potential reference snapshot is found that is available on the target site to be designated as a reference snapshot.

In some embodiments, if the controller/service VM or the dedicated controller goes through each of the potential reference snapshots on the ordered list and determines that none of those snapshots are available on the target site, in some embodiments, the controller/service VM or the dedicated controller may send an indication back to the source site. The source site may then repeat the process 400 by looking for additional potential reference snapshots, creating another ordered list, and sending that list back to the target site. The target site may then repeat the process 700 until a reference snapshot is found. Once the reference snapshot is found, the delta is computed between the source snapshot and the reference snapshot, and the delta may be replicated to the target site. In some embodiments, the delta may be computed on the source site, while in other embodiments, the delta may be computed on the target site. Further, in some embodiments, upon identifying the reference snapshot, a lock may be placed on the reference snapshot for the duration of the replication of the delta to the target site. The lock may prevent the reference snapshot from being deleted on the target site during the replication.

In some embodiments, the processes 400 and 700 may be somewhat modified. For example, in some embodiments, upon identifying the one or more potential reference snapshots at the operation 420, the source site may send the list of the potential reference snapshots to the target site before computing the closeness and creating the ordered list at the operation 425. Upon receiving the list of the potential reference snapshots from the source site, the target site may analyze each of those potential reference snapshots to determine which of those snapshots are available on the target site. Upon identifying the potential reference snapshots that are available on the target site, the target site sends a list to the source site identifying those potential reference snapshots that are available on the target site. Upon receiving the list from the target site, the source site determines the closeness for each of the potential reference snapshots on the list received from the target site, as discussed above at the operation 425. The potential reference snapshot that is closest is then designated as the reference snapshot. In other embodiments, the target site may compute the closeness.

Thus, the present disclosure provides a mechanism by which a reference snapshot is identified having minimum delta (e.g., changed data) or delta below a predetermined threshold with respect to a source snapshot, thereby reducing the amount of data to be transferred to the target site for replication.

Figure 8:
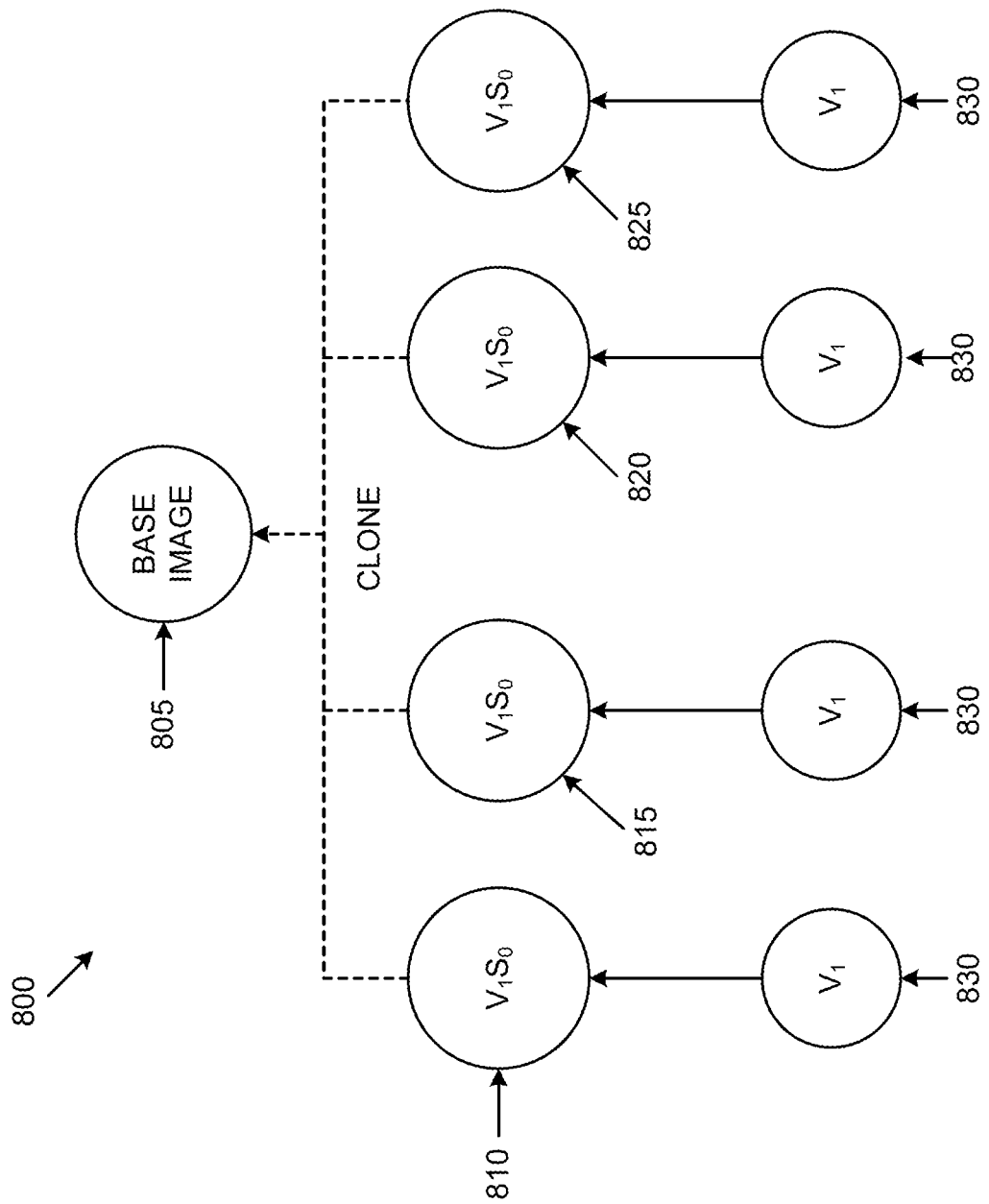
FIG. 8 is an example diagram showing a clone hierarchy in the virtualized environment of FIG. 1, in accordance with some embodiments of the present disclosure.

Referring to FIG. 8, an example virtual disk hierarchy 800 is shown, in accordance with some embodiments of the present disclosure. The virtual disk hierarchy 800 shows creation of multiple namespaces (e.g., live namespaces) created from a single base image 805. For example, clones 810, 815, 820, and 825 may be created from the base image 805, and particularly from one or more vdisks 830 associated with the base image. It is to be understood that the number of clones generated from the base image 805 may vary in other embodiments. Further, although no snapshots are shown in FIG. 8, in some embodiments, one or more snapshots may be created from the base image 805 and/or from one or more of the clones 810-825.

As discussed above, a base image (e.g., the base image 805) may be cloned to multiple namespaces (e.g., live namespaces). A namespace is considered "live" if data may be written to the vdisk(s). For example, when a clone is created, vdisk(s) associated with the clone may be written to. Thus, a clone is part of a live namespace. When snapshots of the clone are taken, the snapshot is a read-only file and data may not be written to the vdisks associated with the snapshot. Thus, a snapshot may be considered a static namespace. The term "namespace" as used herein refers to both live namespaces and static namespaces combined.

The base image 805 may include significant amount of data or shared data disks across different namespaces. Even if the base image 805 is not snapshotted, each of the clones 810-825 may create snapshots (not shown) to keep track of their respective incremental changes. Snapshots created at the clone point (e.g., the clone) may have a lot of common data with the base image 805. If these snapshots of the clones 810-825 are individually fully replicated to the target site, a large amount of redundant data transfer occurs, consuming more resources like storage, compute and network bandwidth. To avoid such redundant transfer of data, a deduplication of data on the source site, the target site, as well as over the network may be used. However, deduplicating of data is complex requiring significant amounts of compute and memory resources, which may not be available on the source site. In some embodiments, a snapshot of the base image 805 may be replicated to the target site before replicating any of the clones 810-825. However, replicating the base image 805 before replicating the clones 810-825 may require a user to first check whether the base image has been replicated, and if not, then replicate the base image before starting replication of the clones 810-825. Such a requirement may be cumbersome and impractical.

To avoid redundant data transfer for the snapshots of the clones 810-825 due to the common data in the base image 805, in some embodiments, a reference snapshot may be selected across the clones 810-825, and the data transfer may occur with respect to the reference snapshot. Although the clones 810-825 are unrelated and have different live namespaces, the vdisks present in those clones belong to the same lineage (e.g., were cloned from the same base image 805), and hence, have common data, which can act as reference for each other. So, a lineage based vdisk identity may be used to identify the reference snapshot in some embodiments. Lineage may be an identification number or any overlay structure created on top of the vdisks to represent the correlation of vdisks across the clones 810-825.

In some embodiments, the first reference resolution in a vdisk lineage may be serialized. Specifically, if a source site replicates a first vdisk in a lineage, then the reference resolution is serialized. In some embodiments, multiple vdisks may try to resolve (e.g., identify) the reference snapshot on the target site at the same time, and since none of the vdisks are replicated to the target site yet, all snapshots may end up being fully replicated. However, if any vdisk in the lineage is already replicated, the reference resolution need not be serialized because an already replicated vdisk can act as a reference for vdisks that are to be replicated after the reference snapshot. In some embodiments, the clones 810-825 may be replicated in parallel even though the reference snapshot is not replicated fully and finalization of each clone on the target site may be done in order to make sure that the reference is finalized first.

Figure 9:
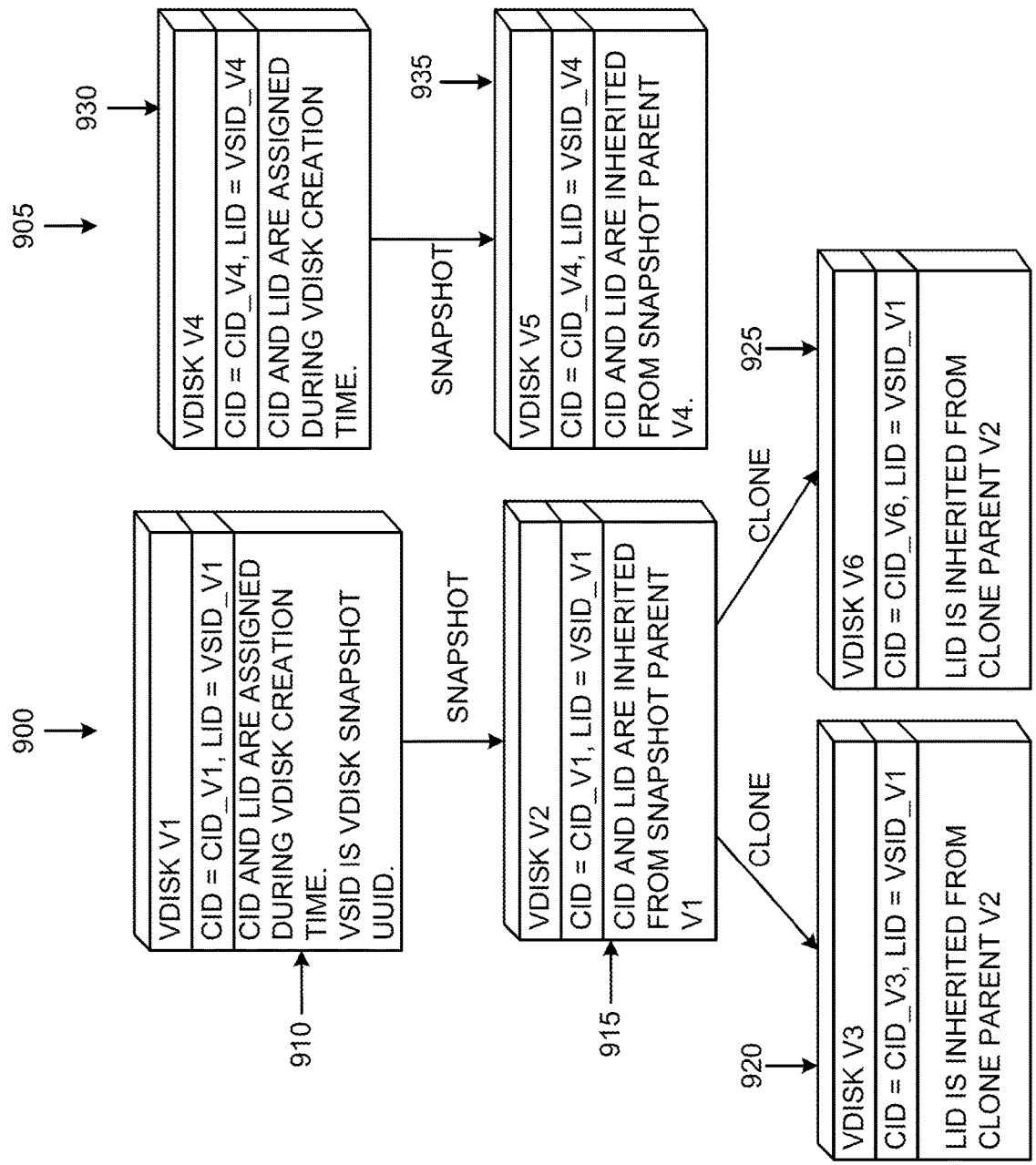
FIG. 9 is an example diagram lineage in a clone hierarchy, in accordance with some embodiments of the present disclosure.

In some embodiments, a lineage may be created for the clones 810-825 by assigning each clone or snapshot a lineage ID ("LID"). As discussed above, the chain configuration data includes parent CID and children CID information. Using this parent CID and children CID information, a lineage may be created, such that all clones and snapshots that are created from a single base image (e.g., the base image 805) have the same LID even though the various namespaces may have different CID. An example is shown in FIG. 9. Specifically, FIG. 9 shows a first family 900 and a second family 905. The first family 900 and the second family 905 may each be assigned different LID since they belong to different lineage, while different namespaces in those families may have different CID but same LID.

For example, the first family 900 may start from a base image 910 (e.g., vdisk V1). The base image 910 may be assigned a CID of CID_v1 and an LID of VSID_v1. In some embodiments, VSID may be a vdisk ID assigned to the vdisk, V1. In some embodiments, each vdisk may have a unique VSID. In some embodiments, the base image 910 may be snapshotted to obtain a snapshot 915. Since the snapshot 915 is part of the same namespace as the base image 910, the CID and LID of the snapshot 915 are same as that of the base image. In some embodiments, the snapshot 915 may be cloned to obtain a first clone 920 and a second clone 925. Each of the first clone 920 and the second clone 925 belong to a different namespace than the base image 910. Thus, each of the first clone 920 and the second clone 925 may be assigned a new CID. For example, the first clone 920 may be assigned a CID of CID_v3 and the second clone 925 may be assigned a CID of CID_v6. However, since the first clone 920 and the second clone 925 are still part of the same lineage, the LID of both those clones may be the same as the LID of the snapshot 915 and the base image 910.

Similarly, the second family 905 may be assigned a CID and LID that is different from the CID and LID, respectively of the first family 900. For example, the second family 905 may include a base image 930 having a CID of CID_v4 and a LID of VSID_v4. All snapshots and clones created from the base image 930 have the same LID. However, when a new clone is created, the new namespace is assigned a new CID. Thus, snapshot 935 generated from the base image 930 is part of the same lineage and namespace as the base image and is therefore assigned the same CID and LID as the base image.

Although the first family 900 and the second family 905 are shown to have a certain configuration, including a certain number of snapshots and/or clones, it is to be understood that the configuration is simply an example and may vary in other embodiments. For example, although no clones are generated from the base image 910, in other embodiments, the base image may be cloned one or more times. Similarly, multiple snapshots may be generated from the base image 910. Likewise, more or less than two clones may be generated from the snapshot 915. Additionally, each of the first clone 920 and the second clone 925 may have additional clones and/or one or more snapshots. Similarly, the configuration of the second family 905 may vary.

Upon determining the LID, replication of each family may be optimized. For example, in some embodiments, upon requesting replication of a particular clone or snapshot, the source site may send the LID of that particular clone or snapshot to the target site. The target site may then determine if a reference snapshot having the LID has previously been replicated. If so, the replication may be performed with respect to that reference snapshot by computing delta, as discussed above.

Figure 10:
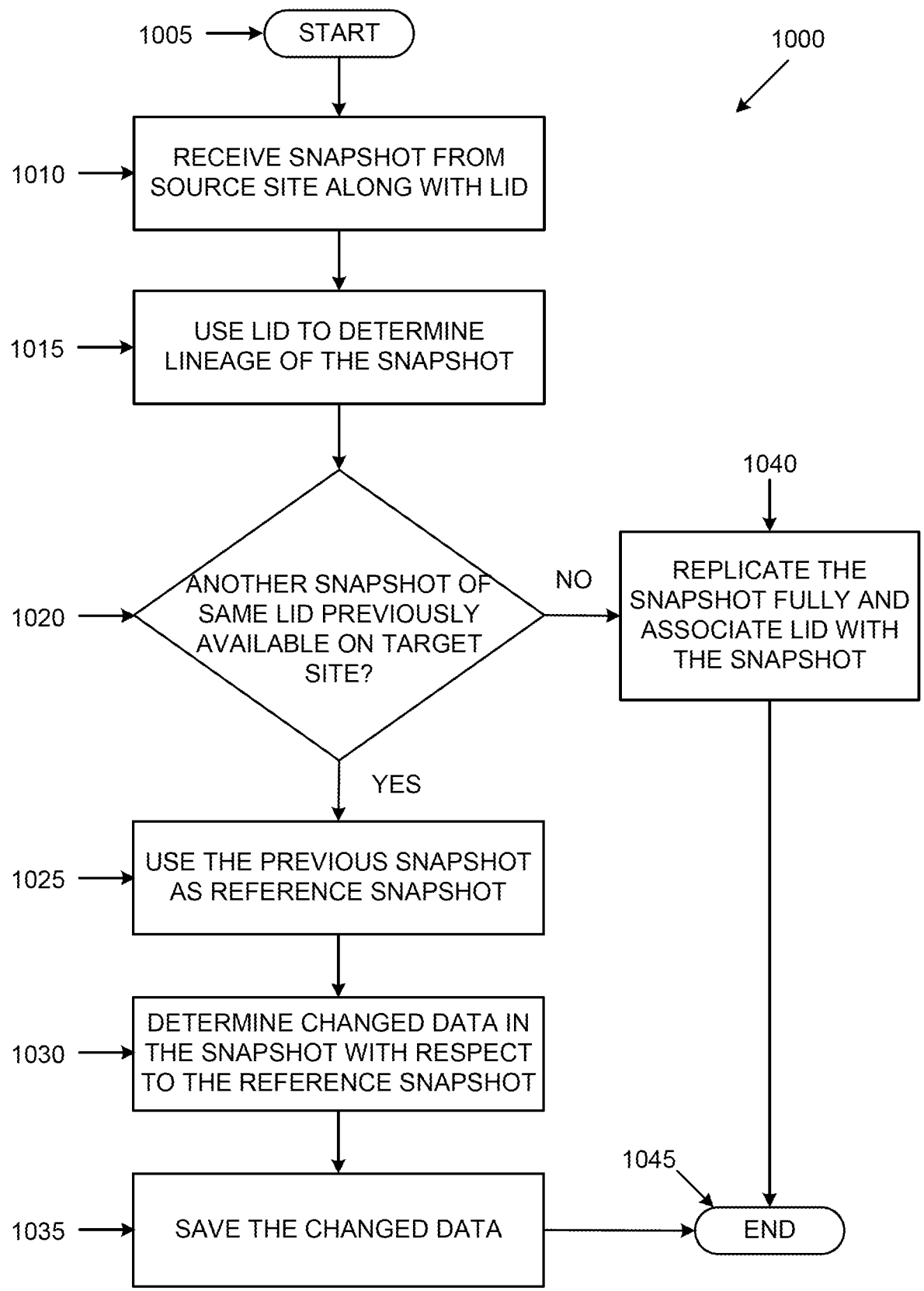
FIG. 10 is an example flowchart outlining operations for replicating data from the source site to the target site based upon lineage, in accordance with some embodiments of the present disclosure.

Referring now to FIG. 10, an example flowchart outlining operations of a process 1000 is shown, in accordance with some embodiments of the present disclosure. The process 1000 may include additional, fewer, or different operations, depending on the particular embodiment. The process 1000 is discussed in conjunction with FIGS. 8 and 9. The process 1000 may be implemented by the controller/service VM of a designated node on the target site or by a dedicated controller configured to facilitate replication/back-up operations on the target site. Upon starting at operation 1005, the process 1000 receives data (e.g., a snapshot) from the source site for replication to the target site. In some embodiments, the source site may include the LID associated with the snapshot that is to be replicated. In some embodiments, the source site may initially only send the LID of the snapshot that is to be replicated. Upon receiving the data (e.g., the snapshot) and the LID or only the LID, the controller/service VM or the dedicated controller uses the LID to determine the lineage of the snapshot at operation 1015. Specifically, at operation 1020, the controller/service VM or the dedicated controller determines whether another snapshot having the same LID as the LID of the snapshot to be replicated is available on the target site.

If at the operation 1020, the controller/service VM or the dedicated controller finds another snapshot from the same lineage that is available on the target site, the controller/service VM or the dedicated controller may designate that available snapshot as the reference snapshot at operation 1025. If the controller/service VM or the dedicated controller finds multiple reference snapshots from the same lineage that were previously designated, in some embodiments, the controller/service VM or the dedicated controller may be configured to designate the most recently replicated snapshot as the reference snapshot. In other embodiments, the controller/service VM or the dedicated controller may be configured to designate the snapshot first replicated in that lineage as the reference snapshot. In some embodiments, the controller/service VM or the dedicated controller may determine a closeness of each of the snapshots previously replicated to the target site with respect to the snapshot being currently replicated (e.g., the snapshot received at the operation 1010) to designate the closest snapshot as the reference snapshot. In some embodiments, the determination of the closeness may be performed by the source site. For example, in some embodiments, the target site may send the list of snapshots previously replicated to the target site back to the source site and the source site may compute the closeness.

Upon identifying a reference snapshot, the controller/service VM or the dedicated controller computes delta at operation 1030. In some embodiments, the delta may be computed on the target site. In other embodiments, the delta may be computed on the target site. Specifically, the controller/service VM or the dedicated controller may compute a difference between the reference snapshot and the snapshot being replicated to determine the changed data. In some embodiments, the operation 1030 may be performed by the source site. For example, in some embodiments, the target site may notify the source site of the identity of the reference snapshot. The source site may then compute the delta and send the delta to the target site. At operation 1035, the controller/service VM or the dedicated controller stores the delta to the target site and the process 1000 ends at operation 1045 waiting for another snapshot to be replicated.

If, on the other hand, at the operation 1020, the controller/service VM or the dedicated controller determines that the LID associated with the snapshot to be replicated is the first LID being replicated (e.g., no previous snapshots with that LID have been replicated to the target site), the process 1000 proceeds to operation 1040. At the operation 1040, the controller/service VM or the dedicated controller creates a full replication of the snapshot. The replicated snapshot may then be used as reference snapshot for replicating future snapshots of the same LID. The process 1000 then ends at the operation 1045.

In some embodiments, once an initial snapshot of a particular LID has been replicated to the target site, other snapshots having the same LID may be replicated in parallel (e.g., according to the operations 1025-1035) using the initial snapshot as the reference snapshot. In some embodiments, the controller/service VM or the dedicated controller of the target site may receive multiple snapshots of the same LID to be replicated in parallel, and the controller/service VM or the dedicated controller may determine that there is no reference snapshot having the same LID on the target site to use. In such cases, the controller/service VM or the dedicated controller may begin the replication of one or more of the multiple snapshots in parallel. The first snapshot to complete replication may be designated the reference snapshot and the remaining ones of the multiple snapshots may be replicated based on that reference snapshot. Thus, even though the multiple snapshots begin replication in parallel, the replication of those snapshots may be finalized upon the finalization of the reference snapshot.

Figure 11:
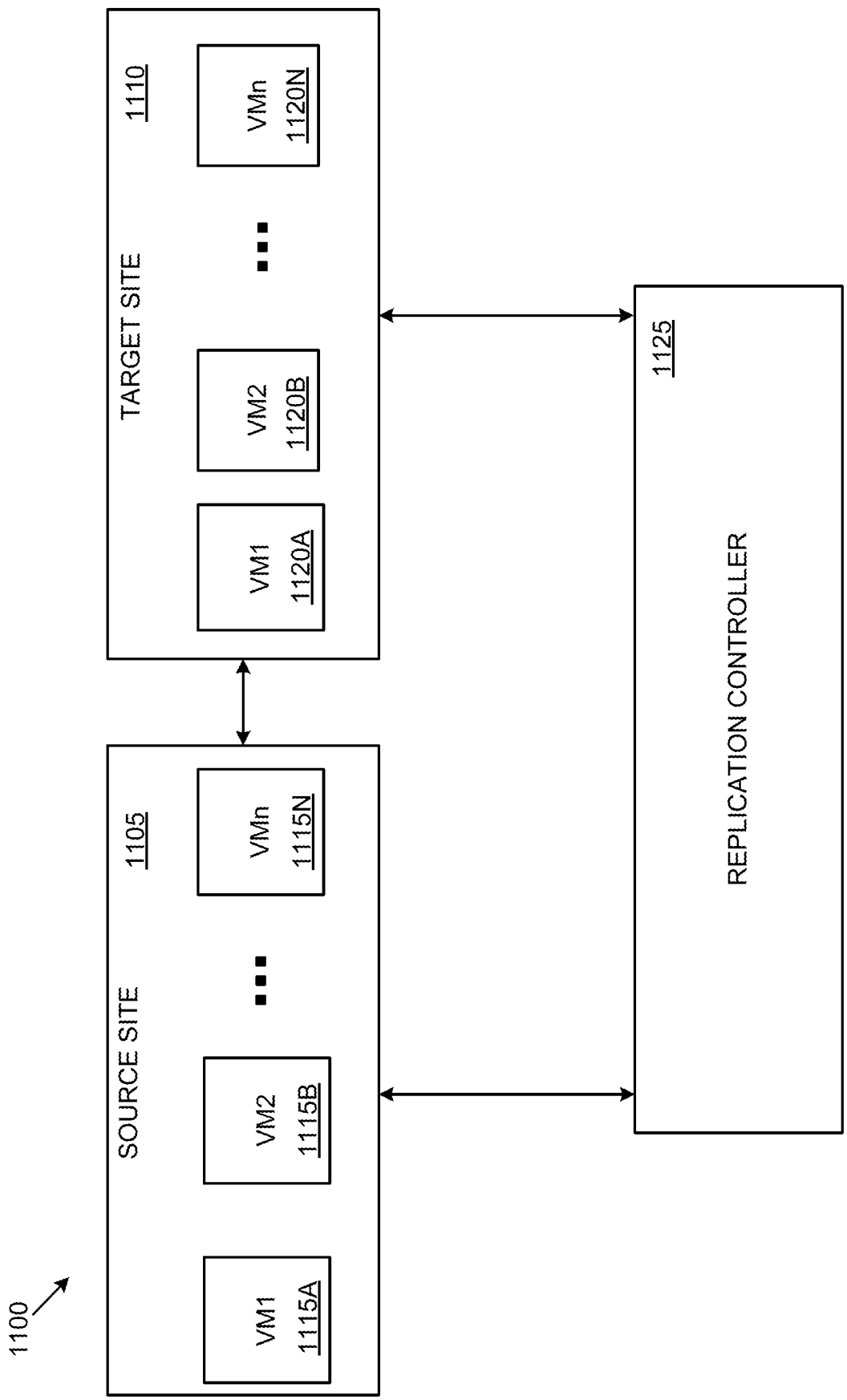
FIG. 11 is an example block diagram showing the source site and the target site in the virtualized environment of FIG. 1, in accordance with some embodiments of the present disclosure.

Turning to FIG. 11, an example replication system 1100 is shown, in accordance with some embodiments of the present disclosure. The replication system 1100 may be used to create backup of data associated with entities located on a source site 1105 and copy or replicate the backup data to a target site 1110, as discussed above. In some embodiments, the source site 1105 may be a client site or another site on which data is stored during regular operations or from which data is migrated to the target site 1110. In some embodiments, the source site 1105 may include one or more clusters, and each of the one or more clusters may be configured similar to the cluster 100 of the virtual computing system described above. For example, in some embodiments, the source site 1105 may include one or more virtual machines such as virtual machines 1115A-1115N (collectively referred to herein as virtual machines 1115). Each of the virtual machines 1115 may be similar to the user VMs 120, 135, 150 described above.

Further, in some embodiments, the virtual machines 1115 may all be part of a single cluster, while in other embodiments, those virtual machines may be spread out across multiple clusters. Additionally, although only virtual machines are shown in the source site 1105, in other embodiments, the source site may include other elements similar to the virtual computing system described above. In some embodiments, the virtual machines 1115 (e.g., the vdisk(s) associated with those virtual machines) may form the base image described above. In other embodiments, other entities of the virtual computing system that may be associated with vdisks or may need to be backed up to the target site 1110 may form the base image.

The target site 1110 may provide a recovery platform for the virtual machines 1115 of the source site 1105 when the source site goes down. Specifically, the target site 1110 provides a mechanism to maintain a continuity of operation and protection of the entities of the source site 1105 during actual or impending disruption of operation of the source site, and thus, keep the source site running without significant interruption until normal operations are resumed. Thus, in some embodiments, the target site 1110 may be considered a disaster recovery site that is a highly engineered, highly reliable platform for providing reliability of operation to the source site 1105. Although the target site 1110 is shown as being associated with a single source site (e.g., the source site 1105), in other embodiments, the target site may be associated with multiple source sites. Further, the target site 1110 may be located in the same location or a location remote from the source site 1105. Similarly, although a single target site is shown, in some embodiments, the source site 1105 may be associated with multiple target sites.

In some embodiments, the target site 1110 may include one or more clusters, and each of the clusters may include one or more virtual machines such as virtual machines 1120A-1120N (collectively referred to herein as virtual machines 1120). In some embodiments, each of the clusters of the target site 1110 may be structured similar to the virtual computing system of FIG. 1. Further, the virtual machines 1120 may all be part of a single cluster or spread across multiple clusters. In some embodiments, the virtual machines 1120 may be similar to the user VMs 120, 135, 150. Additionally, although only the virtual machines 1120 are shown in the target site 1110, in other embodiments, the target site may include other entities to which data from the source site 1105 may be replicated to.

In some embodiments, the data may be replicated to the target site 1110 in anticipation of a failover event. "Replication" may include copying or taking a backup of data of an entity on the source site 1105 and copying or moving the backup data to the target site 1110. A "failover event" may be any event that causes or may potentially cause a disruption of operation at the source site 1105. In some embodiments, the failover event may be a planned failover event such as a scheduled maintenance, planned power outage, or other type of planned downtime of the source site 1105. In other embodiments, the failover event may be an unplanned failover event such as a disaster event (e.g., fire, unplanned power outage, earthquake, etc.) or any other type of unplanned downtime of the source site 1105.

In some embodiments, replication may be facilitated by a replication controller 1125. Although the replication controller 1125 is shown separate from the source site 1105 and the target site 1110, in some embodiments, the replication controller may be part of either the source site, the target site, or a combination of both. Further, in some embodiments, the replication controller 1125 may be part of a hypervisor or controller/service virtual machine of a node (e.g., the leader node). In other embodiments, the replication controller 1125 may be separate from the source site 1105 and the target site 1110 and associated with those sites in operational association. Further, the replication controller 1125 may be a configured as a logical block or circuitry that receives instructions and performs operations in accordance with those instructions. In some embodiments, the replication controller 1125 may be configured as a software, firmware, hardware, or a combination thereof. The replication controller 1125 may be configured to implement the processes 400, 700, and 1000 described above. Although the operations of the processes 400, 700, and 1000 have been described specifically as being performed by the source site or the target site, in some embodiments, all of those operations may be performed by the replication controller 1125.

Further, although not shown, the replication controller 1125 may include one or more Central Processing Unit ("CPU") cores or processors that may be configured to execute instructions for replicating data from the source site 1105 to the target site 1110. The instructions may be stored within a memory device associated with the replication controller 1125. To replicate the data, the replication controller 1125 may read the instructions stored within the memory device. The memory device may be any of a variety of memory types, including a variety of volatile memories, non-volatile memories, or a combination thereof. For example, in some embodiments, the memory device or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use with the replication controller 1125. In some embodiments, the memory device or portions thereof may be configured as other types of storage class memory ("SCM"). Generally speaking, the memory device may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

Additionally, although not shown, in some embodiments, the replication controller 1125 may be associated with a user interface through which user input may be input into the replication controller. Thus, the user interface may facilitate human-computer interaction between the users and the replication controller 1125. In some embodiments, the user interface may present a graphical user interface ("GUI") to a user to receive input from and provide output to the user. The GUI may present a variety of graphical icons, windows, visual indicators, menus, visual widgets, and other indicia to facilitate user interaction. In other embodiments, the user interface may be configured in any suitable way.

Further, the user interface may be configured to receive user inputs in a variety of ways. In some embodiments, the user interface may be configured to receive user inputs via one or more input devices. For example, in some embodiments, a user may use a variety of input technologies such as a keyboard, stylus, touch screen, mouse, track ball, keypad, microphone, voice recognition, motion recognition, remote controllers, input ports, one or more buttons, dials, joysticks, camera, and any other input peripheral that is associated with the replication controller 1125 and that allows an external source, such as a user, to enter information (e.g., data) into the replication controller and send instructions to the replication controller. In other embodiments, the user interface may be configured to receive the user inputs in other ways.

The user interface may also be configured to present outputs/information to the users in a variety of ways. In some embodiments, the user interface may present outputs to the user via the output devices such as external memories, printers, speakers, displays, microphones, light emitting diodes, headphones, plotters, speech generating devices, video devices, global positioning systems, and any other output peripherals that are configured to receive information (e.g., data) from the replication controller 1125. The "data" that is either input into the replication controller 1125 and/or output from the replication controller may include any of a variety of textual data, graphical data, video data, image data, sound data, position data, sensor data, combinations thereof, or other types of analog and/or digital data that is suitable for processing using the replication controller. In other embodiments, the user interface may be configured to present the outputs in other ways (e.g., audible, tactile, or visual alarms, etc.). Generally speaking, the replication controller 1125 may be associated with any type of hardware, software, and/or firmware component that enables the replication controller to perform the functions described herein.

Additionally, in some embodiments, a user may access the user interface and the replication controller 1125 via an Application Programming Interface ("API"). For example, to access the replication controller 1125 via the user interface using the API, a user may use designated devices such as laptops, desktops, tablets, mobile devices, other handheld or portable devices, and/or other types of computing devices that are configured to access the API. In some embodiments, these devices may be different from the computing device on which the replication controller 1125 is installed. In other embodiments, the replication controller 1125 may be hosted on a cloud service and may be accessed through the cloud via a web or mobile application.

In some embodiments, the user may access the user interface of the replication controller 1125 via a web browser, upon entering a uniform resource locator ("URL") for the API such as an IP address or other designated web address. In some embodiments, the user interface of the replication controller 1125 may be accessed via a mobile application downloaded to a mobile device. In other embodiments, the user interface of the replication controller 1125 may be configured for access in other ways. Further, in some embodiments, the API that may be used to communicate with the replication controller 1125 via the user interface may be a representational state transfer ("REST") type of API. In other embodiments, the API may be any other type of web or other type of API (e.g., ASP.NET) built using any of a variety of technologies, such as Java, .Net, etc., that is suitable for facilitating communication between the replication controller 1125 and the users via the user interface. In some embodiments, the API may be configured to facilitate communication via a hypertext transfer protocol ("HTTP") or hypertext transfer protocol secure ("HTTPS") type request. The API may receive an HTTP/HTTPS request and send an HTTP/HTTPS response back. In other embodiments, the API may be configured to facilitate communication using other or additional types of communication protocols. Further, in some embodiments, the replication controller 1125 may communicate with users in ways other than an API.

It is to be understood that only some components of the replication system 1100 are shown and described in FIG. 11. In other embodiments, the replication system 1100 may include other or additional components that may be needed or considered desirable to have in performing the functions described herein.

Turning now to FIG. 12, an example flowchart outlining a process 1200 is shown, in accordance with some embodiments of the present disclosure. The process 1200 may be implemented by the replication controller 1125. The process 1200 may be used to replicate data from a source site (e.g., the source site 1105) to a target site (e.g., the target site 1110). Upon starting at an operation 1205, the replication controller 1125 compiles an ordered list of potential reference snapshots for a source snapshot on the source site at operation 1210. The replication controller 1125 may create the ordered list as discussed in FIG. 4 above. Upon creating the ordered list at the operation 1210, the replication controller 1125 selects one snapshot from the ordered list as the reference snapshot. The replication controller 1125 may select the reference snapshot as discussed above in FIG. 7. At operation 1220, the replication controller 1125 then computes a difference in data between the source snapshot and the reference snapshot selected at the operation 1215. The difference in the data constitutes the delta. At operation 1225, the replication controller 1125 replicates the delta to the target site (e.g., the target site 1110). The process 1200 then ends at operation 1230.

Thus, the present disclosure provides a mechanism to minimize data transfer between a source site and a target site. By maintaining a CID for each snapshot/clone that is created from a base image, the present disclosure enables selection of a reference snapshot even when certain snapshots/clones are deleted. The present disclosure determines a reference snapshot that may either an ancestor or a descendant of a source snapshot. The ancestor/descendant may be in the same namespace as the source snapshot or a different namespace. Thus, a child snapshot/clone may serve as a reference snapshot for a parent snapshot/clone.

In some embodiments, the present disclosure may also be used to provide clone replication support. For example, in some embodiments, a user may clone a base image to create several virtual machines for an application (e.g., to run a test/development environment). In some embodiments, the user may desire to protect the virtual machines and replicate their corresponding snapshots to a target site. Without the present disclosure, each of the snapshots may be fully replicated to the target site wasting network bandwidth, requiring additional time, as well as consuming storage space at the target site. Instead of replicating each of the snapshots to the target site, in some embodiments, an incremental replication mechanism may be used. Since all the snapshots are ultimately created from the same base image, each snapshot may have at least some common data with another snapshot created from the same base image. Thus, either the base image or one of the other snapshots created from the base image may be fully replicated to the target site and the remaining snapshots may be replicated using incremental replications (e.g., by computing delta) based on the fully replicated base image/snapshot at the target site.

In some embodiments, a first snapshot may be designated to be replicated fully to the target site. In some embodiments, the first snapshot may be a snapshot that is an ancestor of other snapshots created from the base image. For example, if snapshots 1-100 are created from the base image and these snapshots need to be replicated to a target site, and snapshot 1 is created before snapshots 2-100, the first snapshot may be designated as the snapshot 1. Snapshot 1 may be fully replicated to the target site. In other embodiments, another snapshot may be designated as the first snapshot to be fully replicated to the target site. In yet other embodiments, the base image may be replicated fully to the target site instead of the first snapshot. Upon replicating the first snapshot fully to the target site, the first snapshot may serve as a reference snapshot to snapshots 2-100. Thus, instead of fully replicating snapshots 2-100 to the target site, a delta may be computed between each of the snapshots 2-100 and snapshot 1, and the delta for each of the snapshots 2-100 may be replicated to the target site, thereby consuming less network bandwidth and saving storage space on the target site. In other embodiments, all of the snapshot 1-100 may start replication to the target site simultaneously. When the first snapshot of the snapshots 1-100 is fully replicated to the target site, the replication of the other snapshots may be stopped. In some embodiments, the stop may be a hard stop such that any data that has already been replicated to the target site may be removed and the replication may start again based on the first snapshot. In other embodiments, the stop may be a soft stop such that any data that has already been replicated to the target site is maintained at the target site and the delta is computed based on the data that has not yet been replicated. Thus, these other snapshots may use the first snapshot as a reference to compute delta and then replicate the delta to the target site.

Further, in some embodiments, each of the snapshots 2-100 may be replicated in parallel or serialized fashion. For example, when snapshots 1 is the reference snapshot, delta may be computed between snapshot 2 and snapshot 1, and the delta may be replicated to the target site for replicating snapshot 2. Then, either snapshot 1 or the delta of snapshot 2 may be used a reference snapshot for snapshot 3. Thus, replication of multiple snapshots that descend from the same base image may be replicated in an efficient and convenient manner.

It is also to be understood that any examples used herein are simply for purposes of explanation and are not intended to be limiting in any way. Although certain operations are described as being performed by the source site, in some embodiments, some or all of those operations may alternatively or additionally be performed by the target site. Similarly, although certain operations are described as being performed by the target site, in some embodiments, some or all of those operations may alternatively or additionally be performed by the source site. The present disclosure may be also be beneficial in instances where data from one source site is being replicated to multiple target sites. For example, when a first portion of data from the source site is replicated to a first target site and a second portion of data from the source site is replicated to a second target site, each of the first and second target sites may have a reference snapshot that may be used to determine delta as discussed above. The present disclosure may be used in other cases as well where reduction in the amount of data being transferred to the target site is desired.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   determining, by a processor executing non-transitory computer-readable instructions stored on a memory, an identifier of a source snapshot to be replicated from a source site to a target site of a virtual computing system;
   determining, by the processor, a predetermined number of potential reference snapshots based on the identifier of the source snapshot;
   computing, by the processor, a closeness value between the source snapshot and each of the potential reference snapshots; and
   creating, by the processor, a list of the potential reference snapshots based on the closeness value of each of the potential reference snapshots,
   wherein one snapshot from the list is selected as a reference snapshot; and
   wherein the source snapshot is replicated to the target site based on the reference snapshot.

2. The method of claim 1, wherein determining the predetermined number of the potential reference snapshots comprises:
   determining, by the processor, a parent snapshot of the source snapshot;
   determining, by the processor, at least one descendant snapshot or at least one ancestor snapshot of the parent snapshot; and
   identifying, by the processor, the predetermined number of the potential reference snapshots from at least one of the parent snapshot, the at least one descendant snapshot, or the at least one ancestor snapshot.

3. The method of claim 1, wherein determining the predetermined number of the potential reference snapshots comprises identifying available snapshots having the identifier that is same as the identifier of the source snapshot.

4. The method of claim 1, further comprising:
   computing, by the processor, a delta indicative of a difference between data of the source snapshot and data of the reference snapshot; and
   replicating, by the processor, the delta from the source site to the target site instead of replicating the source snapshot to the target site in entirety.

5. The method of claim 1, wherein computing the closeness value comprises computing, by the processor, a data distance between the source snapshot and each of the potential reference snapshots by determining an amount of changed data between the source snapshot and each of the potential reference snapshots.

6. The method of claim 1, wherein computing the closeness value comprises computing, by the processor, a path distance between the source snapshot and each of the potential reference snapshots by determining a number of snapshots that exist between the source snapshot and each of the potential reference snapshots.

7. The method of claim 1, wherein computing the closeness value comprises computing, by the processor, a time distance between the source snapshot and each of the potential reference snapshots by computing a time difference between creation of the source snapshot and creation of each of the potential reference snapshots.

8. The method of claim 1, where the reference snapshot and the source snapshot belong to a same namespace.

9. The method of claim 1, wherein the reference snapshot and the source snapshot belong to different namespaces.

10. The method of claim 1, wherein the reference snapshot is a descendant of the source snapshot.

11. The method of claim 1, wherein the reference snapshot is an ancestor of the source snapshot.

12. A system comprising:
    a processor that executes non-transitory computer-readable instructions stored on a memory to:
       determine an identifier of a source snapshot to be replicated from a source site to a target site of a virtual computing system;
       determine a predetermined number of potential reference snapshots based on the identifier of the source snapshot;
       compute a closeness value between the source snapshot and each of the potential reference snapshots; and
       create a list of the potential reference snapshots based on the closeness value of each of the potential reference snapshots,
    wherein one snapshot from the list is selected as a reference snapshot; and
    wherein the source snapshot is replicated to the target site based on the reference snapshot.

13. The system of claim 12, wherein to compute the closeness value, the memory stores non-transitory computer-readable instructions that when executed by the processor cause the processor to compute a data distance between the source snapshot and each of the potential reference snapshots based upon an amount of changed data between the source snapshot and each of the potential reference snapshots.

14. The system of claim 12, wherein the memory stores non-transitory computer-readable instructions that when executed by the processor cause the processor to:
    compute a delta indicative of a difference between data of the source snapshot and data of the reference snapshot; and
    replicate the delta from the source site to the target site instead of replicating the source snapshot to the target site in entirety.

15. The system of claim 12, wherein the reference snapshot is already replicated to the target site.

16. The system of claim 12, wherein the reference snapshot is a descendant of the source snapshot, and wherein the reference snapshot belongs to either a same namespace or a different namespace as the source snapshot.

17. The system of claim 12, wherein the reference snapshot is an ancestor of the source snapshot, and wherein the reference snapshot belongs to either a same namespace or a different namespace as the source snapshot.

18. A non-transitory computer readable media having computer-readable instructions stored thereon that when executed by a processor of a virtual computing system, cause the processor to perform a process comprising:
  determining an identifier of a source snapshot to be replicated from a source site to a target site of a virtual computing system;
  determining a predetermined number of potential reference snapshots based on the identifier of the source snapshot;
  computing a closeness value between the source snapshot and each of the potential reference snapshots; and
  creating a list of the potential reference snapshots based on the closeness value of each of the potential reference snapshots,
  wherein one snapshot from the list is selected as a reference snapshot; and
  wherein the source snapshot is replicated to the target site based on the reference snapshot.

19. The non-transitory computer readable media of claim 18 further comprising computer-readable instructions that when executed by the processor cause the processor to:
  compute a delta indicative of a difference between data of the source snapshot and data of the reference snapshot; and
  replicate the delta from the source site to the target site instead of replicating the source snapshot to the target site in entirety.

20. The non-transitory computer readable media of claim 18 further comprising computer-readable instructions that when executed by the processor cause the processor to compute a data distance between the source snapshot and each of the potential reference snapshots based upon an amount of changed data between the source snapshot and each of the potential reference snapshots.

21. The system of claim 12, wherein to compute the closeness value, the memory stores non-transitory computer-readable instructions that when executed by the processor cause the processor to compute a path distance between the source snapshot and each of the potential reference snapshots based upon a number of snapshots that exist between the source snapshot and each of the potential reference snapshots.

22. The system of claim 12, wherein to compute the closeness value, the memory stores non-transitory computer-readable instructions that when executed by the processor cause the processor to compute a time distance between the source snapshot and each of the potential reference snapshots based upon a time difference between creation of the source snapshot and creation of each of the potential reference snapshots.

23. The system of claim 12, wherein the memory stores non-transitory computer-readable instructions that when executed by the processor cause the processor to:
  determine a parent snapshot of the source snapshot;
  determine at least one descendant snapshot or at least one ancestor snapshot of the parent snapshot; and
  identify the predetermined number of the potential reference snapshots from at least one of the parent snapshot, the at least one descendant snapshot, or the at least one ancestor snapshot.

24. The system of claim 12, wherein the memory stores non-transitory computer-readable instructions that when executed by the processor cause the processor to:
  associate each of a plurality of storage disks in the virtual computing system with one of a plurality of namespaces; and
  assign each of the plurality of namespaces a unique identifier, wherein each storage disk of the plurality of storage disks in a particular namespace has the same unique identifier.

25. The method of claim 1, wherein the reference snapshot is already replicated to the target site.

26. The method of claim 1, further comprising:
  associating, by the processor, each of a plurality of storage disks in the virtual computing system with one of a plurality of namespaces; and
  assigning, by the processor, each of the plurality of namespaces a unique identifier, wherein each storage disk of the plurality of storage disks in a particular namespace has the same unique identifier.

27. The non-transitory computer readable media of claim 18 further comprising computer-readable instructions that when executed by the processor cause the processor to compute a path distance between the source snapshot and each of the potential reference snapshots based upon a number of snapshots that exist between the source snapshot and each of the potential reference snapshots.

28. The non-transitory computer readable media of claim 18 further comprising computer-readable instructions that when executed by the processor cause the processor to compute a time distance between the source snapshot and each of the potential reference snapshots based upon a time difference between creation of the source snapshot and creation of each of the potential reference snapshots.

29. The non-transitory computer readable media of claim 18 further comprising computer-readable instructions that when executed by the processor cause the processor to:
  determine a parent snapshot of the source snapshot;
  determine at least one descendant snapshot or at least one ancestor snapshot of the parent snapshot; and
  identify the predetermined number of the potential reference snapshots from at least one of the parent snapshot, the at least one descendant snapshot, or the at least one ancestor snapshot.

30. The non-transitory computer readable media of claim 18 further comprising computer-readable instructions that when executed by the processor cause the processor to:
  associate each of a plurality of storage disks in the virtual computing system with one of a plurality of namespaces; and
  assign each of the plurality of namespaces a unique identifier, wherein each storage disk of the plurality of storage disks in a particular namespace has the same unique identifier.

\* \* \* \* \*